(12) United States Patent
Minoura et al.

(10) Patent No.: US 8,980,787 B2
(45) Date of Patent: Mar. 17, 2015

(54) METHOD FOR PRODUCING GRAPHITE MATERIAL AND GRAPHITE MATERIAL

(75) Inventors: Seiji Minoura, Gifu (JP); Fumihito Ogawa, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/492,913

(22) Filed: Jun. 10, 2012

(65) Prior Publication Data

US 2012/0315213 A1    Dec. 13, 2012

(30) Foreign Application Priority Data

Jun. 10, 2011    (JP) .................................. 2011-130530

(51) Int. Cl.
*C04B 35/63*    (2006.01)
*C04B 35/634*    (2006.01)
(Continued)

(52) U.S. Cl.
CPC ........... *C04B 35/63416* (2013.01); *C01B 31/04* (2013.01); *C04B 35/521* (2013.01); *C04B 35/522* (2013.01); *C04B 35/532* (2013.01); *C04B 35/6261* (2013.01); *C04B 35/62655* (2013.01); *C04B 35/62695* (2013.01); *C04B 2235/5296* (2013.01); *C04B 2235/5427* (2013.01); *C04B 2235/5436* (2013.01); *C04B 2235/5472* (2013.01); *C04B 2235/604* (2013.01);
(Continued)

(58) Field of Classification Search
CPC ..................... C04B 35/63416; C04B 35/6261; C04B 35/62695; C04B 35/321; C04B 35/62655; C04B 35/532; C04B 35/522; C04B 2235/6567; C04B 2235/6562; C04B 2235/5427; C04B 2235/604; C04B 2235/5436; C04B 2235/96; C04B 2235/9607; C04B 2235/5296; C04B 2235/5472; C01B 31/04
USPC .......................... 423/448, 460; 502/413, 416
See application file for complete search history.

(56) References Cited

U.S. PATENT DOCUMENTS 4,985,184 A * 1/1991 Takahashi et al. ................. 264/6
5,525,276 A * 6/1996 Okuyama et al. ............ 264/29.3

FOREIGN PATENT DOCUMENTS

JP    58208113 A  * 12/1983
JP    62-108721       5/1987
(Continued)

OTHER PUBLICATIONS

Machine english translation of JP2004059332.*
Korean Office Action for corresponding KR Application No. 10-2012-0061365, Oct. 10, 2013, Machine translation reviewed.

*Primary Examiner* — Richard M Rump
(74) *Attorney, Agent, or Firm* — Mori & Ward, LLP

(57) ABSTRACT

There is provided a method for producing a graphite material and a graphite material produced by the method The method includes a kneading step of adding a hydrophobic binding material to a first carbonaceous raw material containing coke powder, followed by heat kneading to obtain a mixture, a pulverizing step of pulverizing the mixture obtained in the kneading step to obtain a second carbonaceous raw material, a granulating step of obtaining a granulated powder using the second carbonaceous raw material obtained in the pulverizing step, a hydrophilic binding material and a solvent, a molding step of subjecting the granulated powder obtained in the granulating step to cold isostatic press molding to obtain a molded body, a burning step of burning the molded body obtained in the molding step to obtain a burnt product, and a graphitizing step of graphitizing the burnt product obtained in the burning step.

6 Claims, 13 Drawing Sheets

(51) Int. Cl.
*C01B 31/04* (2006.01)
*C04B 35/52* (2006.01)
*C04B 35/532* (2006.01)
*C04B 35/626* (2006.01)

(52) U.S. Cl.
CPC . *C04B 2235/6562* (2013.01); *C04B 2235/6567* (2013.01); *C04B 2235/96* (2013.01); *C04B 2235/9607* (2013.01)
USPC .......................................... 502/416; 428/304.4

(56) References Cited

FOREIGN PATENT DOCUMENTS

| | | |
|---|---|---|
| JP | 4-119965 | 4/1992 |
| JP | 4-144907 | 5/1992 |
| JP | 11-100267 | 4/1999 |
| JP | 2004-127756 | 4/2004 |
| JP | 2010-503605 | 2/2010 |
| KR | 10-2004-0010001 | 1/2004 |

* cited by examiner

50 μm

200 μm

600 μm

FIG. 4A
FIG. 4B
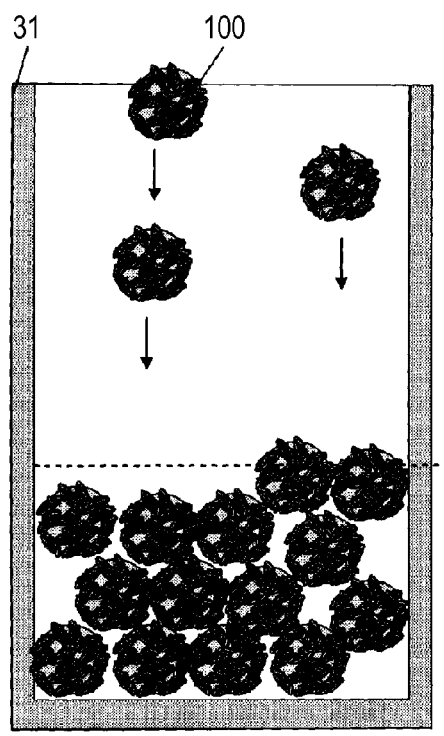
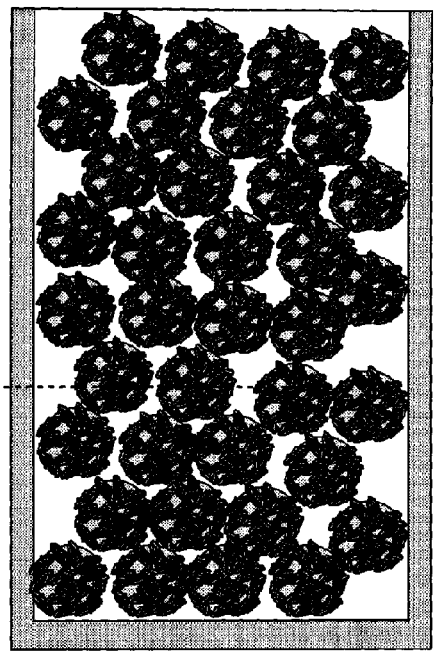

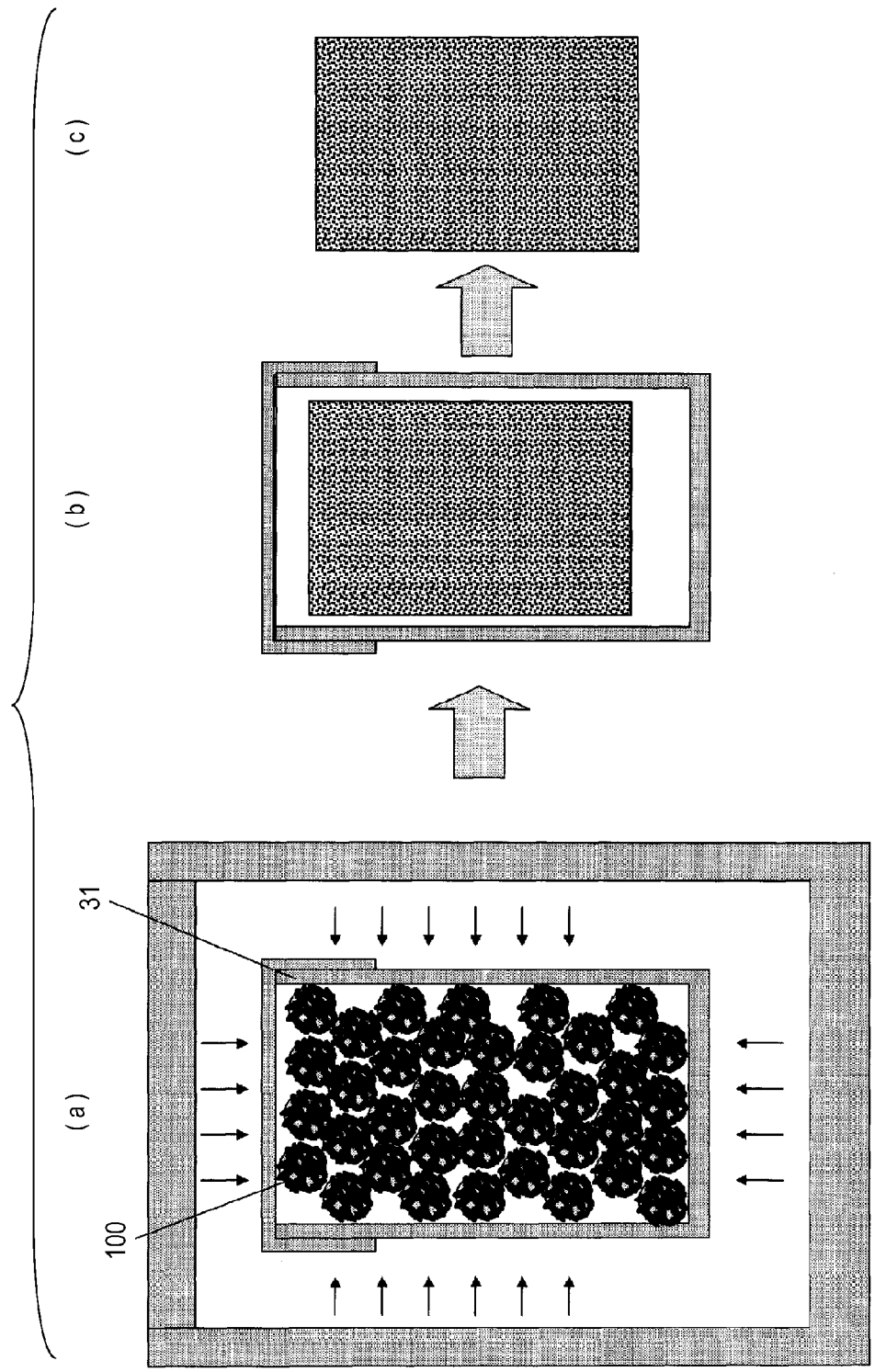

FIG. 7A

EXAMPLES 1 to 3

KNEADING STEP S1
↓
PULVERIZING STEP S2
↓
GRANULATING STEP S3
↓
MOLDING STEP S4
↓
BURNING STEP S5
↓
GRAPHITIZING STEP S6

FIG. 7B

COMPARATIVE EXAMPLE 1 AND 2

KNEADING STEP S1
↓
PULVERIZING STEP S2
↓
MOLDING STEP S4
↓
BURNING STEP S5
↓
GRAPHITIZING STEP S6

FIG. 7C

COMPARATIVE EXAMPLE 3

GRANULATING STEP
↓
KNEADING STEP S1
↓
PULVERIZING STEP S2
↓
MOLDING STEP S4
↓
BURNING STEP S5
↓
GRAPHITIZING STEP S6

FIG. 8

Examples

| | Raw Material | Dp50 / HGI | Kneading | Dp50 of Mixture | Granulation * | Dp50 of Granulated Powder μm | Compression Failure Strength MPa | Filling Container Height mm | Bulk Density g/cm³ | Molding Pressure MPa |
|---|---|---|---|---|---|---|---|---|---|---|
| Example 1 | Calcined coke Pitch | 14.7 / 28 | Coke: 100 parts by weight Pitch: 287 parts by weight Temperature: 251°C | 27.7μm | PVA: 1.0 part by weight Water: 100 parts by weight | 203 | 0.0937 | 1400 | 0.595 | 100 |
| Example 2 | Calcined coke Pitch | 14.7 / 28 | Coke: 100 parts by weight Pitch: 287 parts by weight Temperature: 261°C | 28.2μm | PVA: 1.0 part by weight Water: 100 parts by weight | 261 | 0.0957 | 1400 | 0.589 | 100 |
| Example 3 | Calcined coke Pitch | 15.2 / 34 | Coke: 100 parts by weight Pitch: 287 parts by weight Temperature: 253°C | 26.7μm | PVA: 1.0 part by weight Water: 100 parts by weight | 231 | 0.0962 | 1400 | 0.592 | 100 |
| Comparative Example 1 | Calcined coke Pitch | 14.1 / 31 | Coke: 100 parts by weight Pitch: 287 parts by weight Temperature: 257°C | 25.6μm | | | - | 1400 | 0.740 | 100 |
| Comparative Example 2 | Calcined coke Pitch | 14.5 / 25 | Coke: 100 parts by weight Pitch: 287 parts by weight Temperature: 255°C | 26.3μm | | | - | 1500 | 0.723 | 100 |
| Comparative Example 3 | Calcined coke (Granulated by PVA) Pitch | 14.4 / 31 | Coke: 100 parts by weight Pitch: 287 parts by weight Temperature: 262°C | 27.2μm | | | - | 1500 | 0.735 | 100 |

* Amounts based on 100 parts by weight of the second carbonaceous raw material

FIG. 9

Examples

| | Size mm | Specimen Position | Bulk Specific Gravity | Shore Hardness | Bending Strength MPa | Specific Resistance (mΩcm) | | CTE (×10⁶ °C) | |
|---|---|---|---|---|---|---|---|---|---|
| | | | | | | AG/WG | Anisotropic Ratio | AG/WG | Anisotropic Ratio |
| Example 1 | 300×600× H1100 | Upper | 1.79 | 62 | 58.5 | 1.44/1.43 | 0.7 | 5.10/5.09 | 0.2 |
| | | Lower | 1.79 | 63 | 66.1 | 1.40/1.42 | 1.4 | 5.08/5.23 | 3.0 |
| Example 2 | 300×600× H1100 | Upper | 1.80 | 62 | 62.1 | 1.43/1.43 | 0.7 | 5.08/5.23 | 3.0 |
| | | Lower | 1.79 | 61 | 61.6 | 1.42/1.45 | 2.1 | 5.16/5.30 | 2.7 |
| Example 3 | 300×600× H1100 | Upper | 1.72 | 47 | 47.4 | 1.20/1.19 | 0.8 | 4.51/4.35 | 3.7 |
| | | Central | 1.72 | 46 | 48.0 | 1.15/1.17 | 1.7 | 4.34/4.45 | 2.5 |
| | | Lower | 1.72 | 47 | 49.7 | 1.20/1.21 | 1.8 | 4.49/4.37 | 2.7 |
| Comparative Example 1 | 300×600× H1100 | Upper | 1.77 | 51 | 60.7 | 1.26/1.23 | 2.4 | 4.10/3.82 | 7.3 |
| | | Central | 1.75 | 50 | 64.6 | 1.25/1.18 | 5.9 | 4.30/3.86 | 11.4 |
| | | Lower | 1.77 | 51 | 60.7 | 1.33/1.17 | 13.7 | 4.43/3.75 | 18.1 |
| Comparative Example 2 | ⌀ 350×H1200 | Upper | 1.75 | 50 | 63.0 | 1.30/1.23 | 5.7 | 4.34/4.09 | 6.1 |
| | | Central | 1.77 | 51 | 66.3 | 1.27/1.16 | 9.5 | 4.50/3.73 | 20.6 |
| | | Lower | 1.78 | 53 | 71.0 | 1.34/1.13 | 18.6 | 4.65/3.83 | 21.4 |
| Comparative Example 3 | ⌀ 350×H1200 | Upper | 1.75 | 50 | 62.2 | 1.30/1.23 | 5.7 | 4.34/4.09 | 6.1 |
| | | Central | 1.78 | 53 | 70.8 | 1.34/1.13 | 18.6 | 4.64/3.83 | 21.1 |

BEFORE COMPRESSION          DURING COMPRESSION

FIG. 12A
FIG. 12B
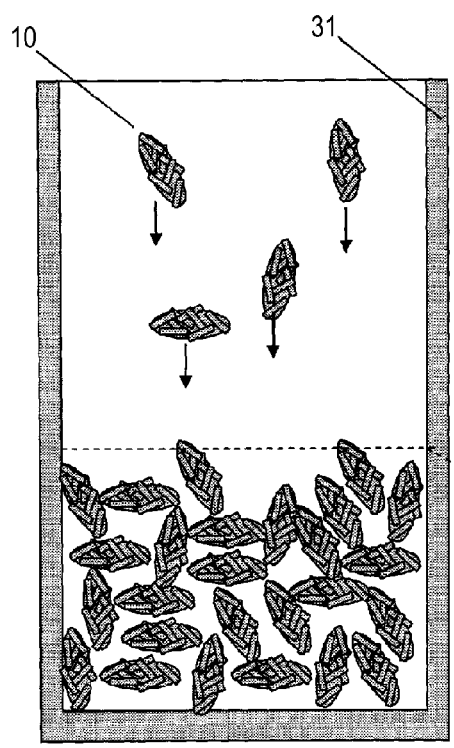
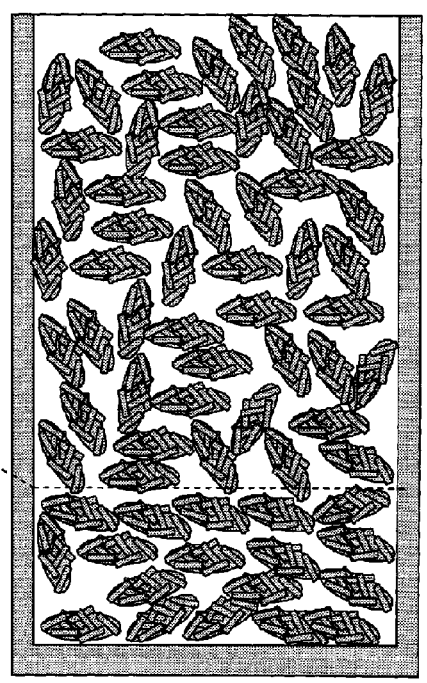

METHOD FOR PRODUCING GRAPHITE MATERIAL AND GRAPHITE MATERIAL

CROSS-REFERENCE TO RELATED APPLICATION

This application claims priority from Japanese Patent Application No. 2011-130530, filed on Jun. 10, 2011, the entire subject matter of which is incorporated herein by reference.

BACKGROUND OF THE INVENTION

1. Field of the Invention

The present invention relates to a method for producing a graphite material and a graphite material.

2. Description of the Related Art

There has been known a method for producing an isotropic graphite material, which includes a step of filling a molding raw material into a rubber case and a molding step of applying uniform hydrostatic pressure on the rubber case via a solvent from all directions (refer to JP-A-S62-108721). The molding method of applying uniform hydrostatic pressure from all directions is called cold isostatic press molding (CIP molding).

In JP-A-S62-108721, a finely pulverized mixture (kneaded product) of coke powder and a binder or fine green coke powder having low anisotropy is used as the molding raw material.

The disclosure of JP-A-S62-108721 is incorporated herein by reference.

The graphite material obtained by the CIP molding described in JP-A-S62-108721 can be decreased in anisotropy of the material, compared to a graphite material obtained by uniaxial molding (embossing molding or extrusion molding). However, in recent years, the graphite material obtained by the CIP molding has increased in size, and it has been considered to be difficult to obtain a uniform material free from or reduced anisotropy throughout the material.

SUMMARY OF THE INVENTION

Accordingly, an aspect of the present invention provides a method for producing a graphite material and a graphite material having high isotropy while reducing anisotropy throughout a material.

According to an illustrative embodiment of the invention, there is provided a method for producing a graphite material, comprising: a kneading step of adding a hydrophobic binding material to a first carbonaceous raw material containing coke powder, followed by heat kneading to obtain a mixture; a pulverizing step of pulverizing the mixture obtained in the kneading step to obtain a second carbonaceous raw material; a granulating step of obtaining a granulated powder using the second carbonaceous raw material obtained in the pulverizing step, a hydrophilic binding material and a solvent; a molding step of subjecting the granulated powder obtained in the granulating step to cold isostatic press molding to obtain a molded body; a burning step of burning the molded body obtained in the molding step to obtain a burnt product; and a graphitizing step of graphitizing the burnt product obtained in the burning step.

According to another illustrative embodiment of the present invention, there is provided a graphite material which is produced by the above method and has an anisotropic ratio of a coefficient of thermal expansion of about 5% or less.

According to the above configuration, a granulated powder is obtained by the step of heat-kneading a first carbonaceous raw material having high anisotropy together with a hydrophobic binding material to obtain a mixture, the step of pulverizing the mixture to obtain a second carbonaceous raw material and the step of further adding a hydrophilic binding material and a solvent to the second carbonaceous raw material to perform granulation. This granulated powder contains voids, is round, has isotropy or a shape which is liable to induce isotropy by molding, such as a substantially flattened shape, and has such hardness as not to be crushed under pressure due to the gravity of the powder in a filling container.

Therefore, it can be prevented or reduced that the second carbonaceous raw material which forms the granulated powder is crushed by the gravity of the granulated powder in the filling container or changed in direction thereof. The second carbonaceous raw material which forms the granulated powder is anisotropically CIP molded while lacking direction, so that a graphite material having lower material anisotropy can be obtained.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 2A to 2C show polarization microscope photographs in an illustrative embodiment of the invention, wherein FIG. 2A shows a first carbonaceous raw material, FIG. 2B shows a second carbonaceous raw material and FIG. 2C shows a granulated powder;

FIGS. 3A to 3C show schematic views in an illustrative embodiment of the invention, wherein FIG. 3A shows a first carbonaceous raw material, FIG. 3B shows a second carbonaceous raw material and FIG. 3C shows a granulated powder;

FIGS. 4A and 4B are views for explaining a step of filling a granulated powder into a rubber case used in CIP molding in an illustrative embodiment of the invention, wherein FIG. 4A shows a state during filling and FIG. 4B shows a state after filling;

FIG. 5 is a view for explaining a step of subjecting a granulated powder to CIP molding in an illustrative embodiment of the invention;

FIGS. 7A to 7C are flow charts showing steps in Examples and Comparative Examples;

FIG. 8 is a table showing production parameters in Examples and Comparative Examples;

FIG. 9 is a table showing the measurement results of graphite obtained by methods of Examples and Comparative Examples;

FIGS. 12A and 12B are views for explaining a step of filling a second carbonaceous raw material into a rubber case used in a related-art CIP molding (Comparative Example 1), wherein FIG. 12A shows a state during filling and FIG. 12B shows a state after filling.

DETAILED DESCRIPTION

Figure 1:
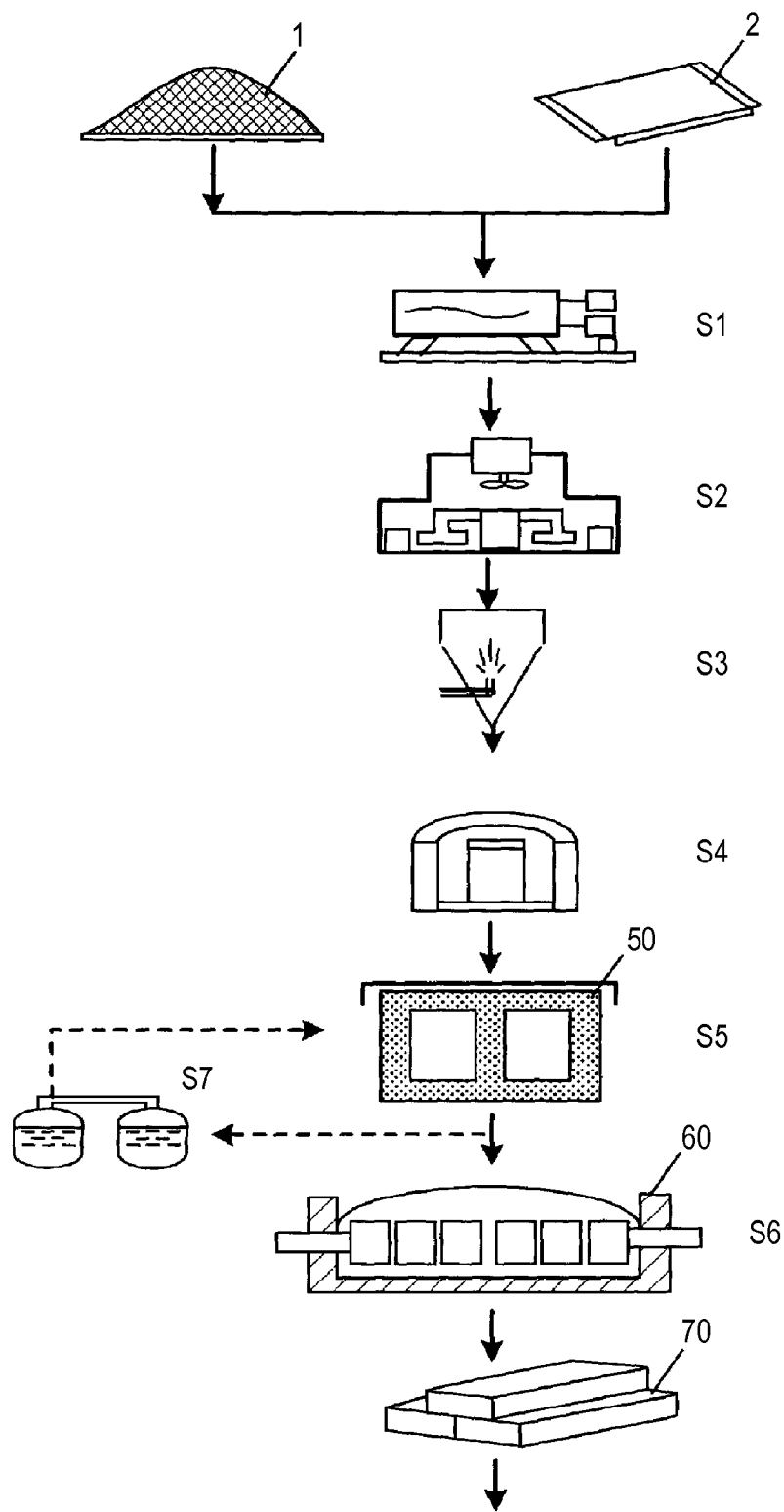
FIG. 1 is an explanatory view showing a method for producing a graphite material in an illustrative embodiment of the invention.

In this application, anisotropy refers to a property of being directionally dependent. In this application, an anisotropic ratio is a value obtained by quantifying the largeness in anisotropy. Specifically, a property of a material is measured in two directions perpendicular to each other, and a value obtained by subtracting 1 from a value obtained by dividing the maximum measured value by the minimum measured value is taken as the anisotropic ratio.

Specifically, a coefficient of thermal expansion and a specific resistance are measured in respective directions of the material, and the anisotropic ratio is calculated from the measured values.

In this application, a direction in which raw material grains are oriented is represented by WG (with grain), and a direction perpendicular to the direction in which the raw material grains are oriented is represented by AG (across grain).

An upper-lower direction of a graphite material indicates an upper-lower direction at the time when a powder before molding is filled into a filling container, unless otherwise specified.

The graphite material is produced using an anisotropic raw material. For this reason, directionality caused in a molding stage is fixed as such, and determined as directionality of the graphite material. In extrusion molding, the raw material grains are oriented in an extrusion direction, and in embossing molding, the raw material grains are oriented in a direction perpendicular to a compression direction. In the related-art CIP molding described in JP-A-S62-108721, the grains are isotropically molded in the molding stage. However, the raw material grains become liable to be oriented in a horizontal direction of the filling container (a rubber case is generally used) in a stage where the powder is filled into the container, prior to the CIP molding.

An illustrative embodiment of the invention provides a method for producing a graphite material. The method includes a kneading step of adding a hydrophobic binding material to a first carbonaceous raw material containing coke powder, followed by heat kneading to obtain a mixture, a pulverizing step of pulverizing the mixture obtained in the kneading step to obtain a second carbonaceous raw material, a granulating step of obtaining a granulated powder from the second carbonaceous raw material obtained in the pulverizing step and a hydrophilic binding material, a molding step of subjecting the granulated powder obtained in the granulating step to cold isostatic press molding to obtain a molded body, a step of burning the molded body obtained in the molding step to obtain a burnt product, and a step of graphitizing the burnt product obtained in the burning step, wherein the second carbonaceous raw material and hydrophilic binding material are granulated using a solvent in the granulating step. Further, an illustrative embodiment of the invention provides a graphite material produced by the above method and having an anisotropic ratio of the coefficient of thermal expansion of about 5% or less.

Illustrative embodiments of the invention will be described in detail below with reference to the drawings.

Figure 2A:
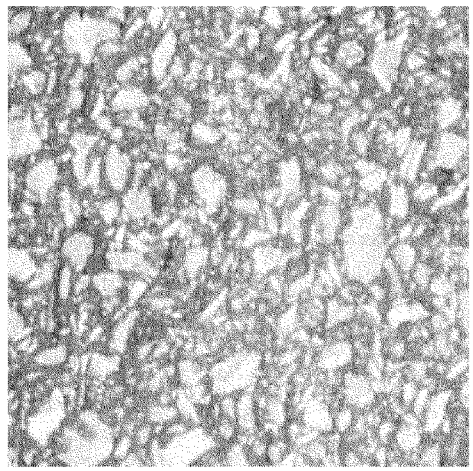
Figure 2B:
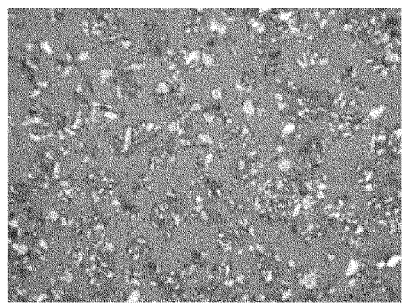
Figure 2C:
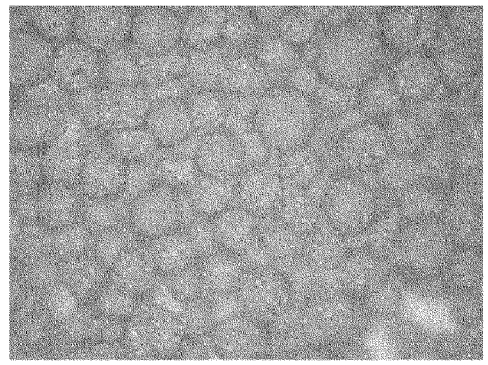
Figure 3C:
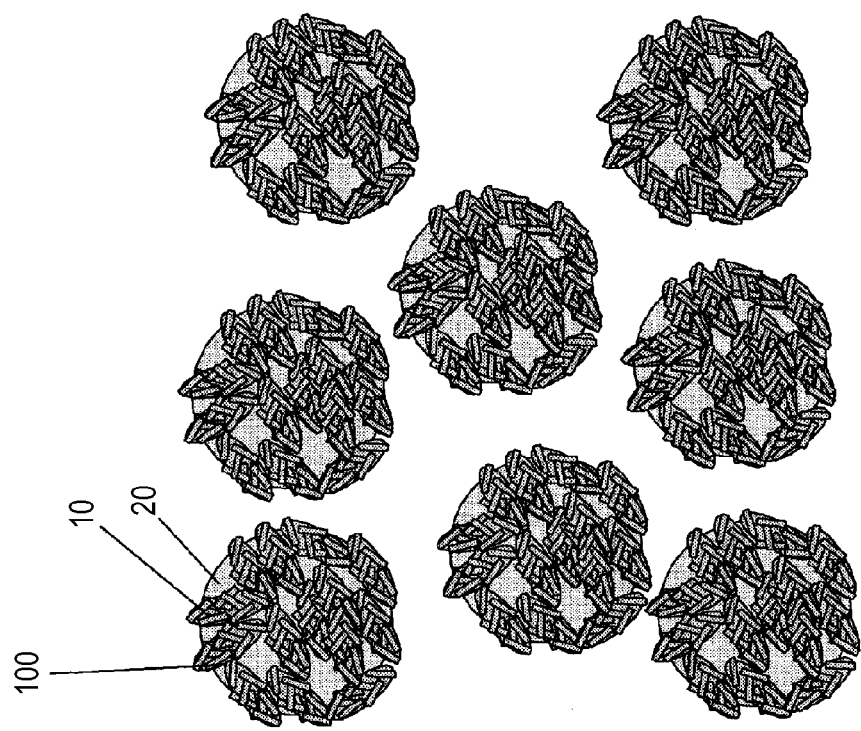
Figure 3A:
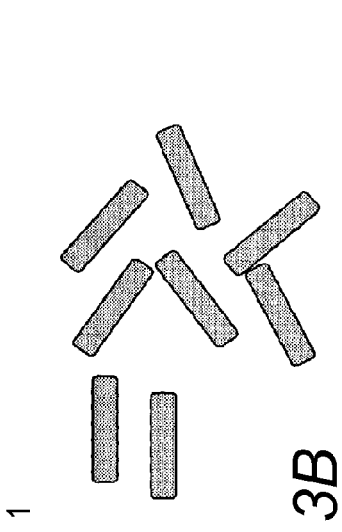
Figure 3B:
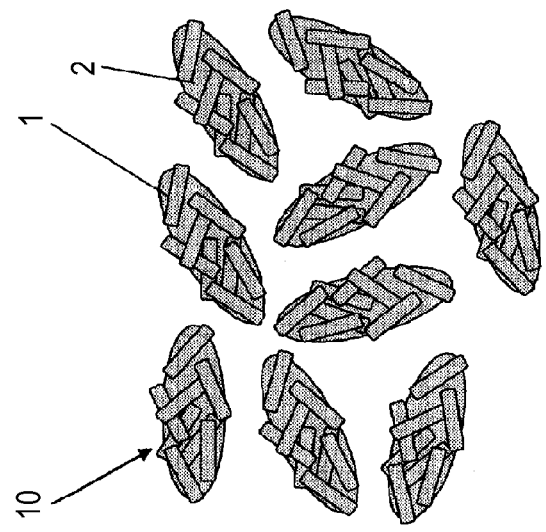
Figure 6A:
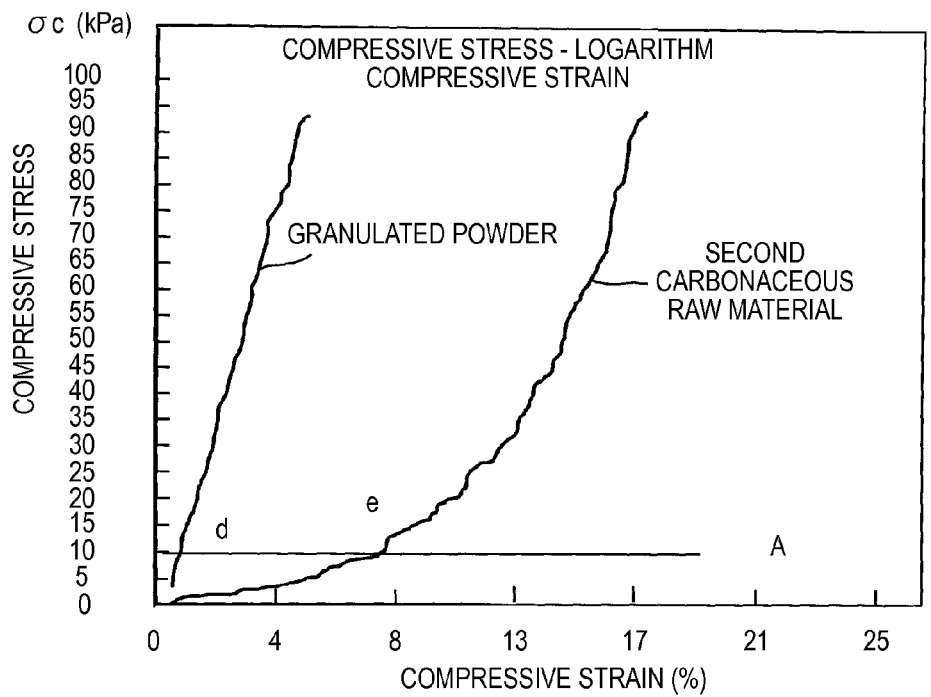
FIG. 6A is a graph showing respective relationships between compressive strain and compressive stress for a second carbonaceous raw material and a granulated powder in an illustrative embodiment of the invention.
Figure 6B:
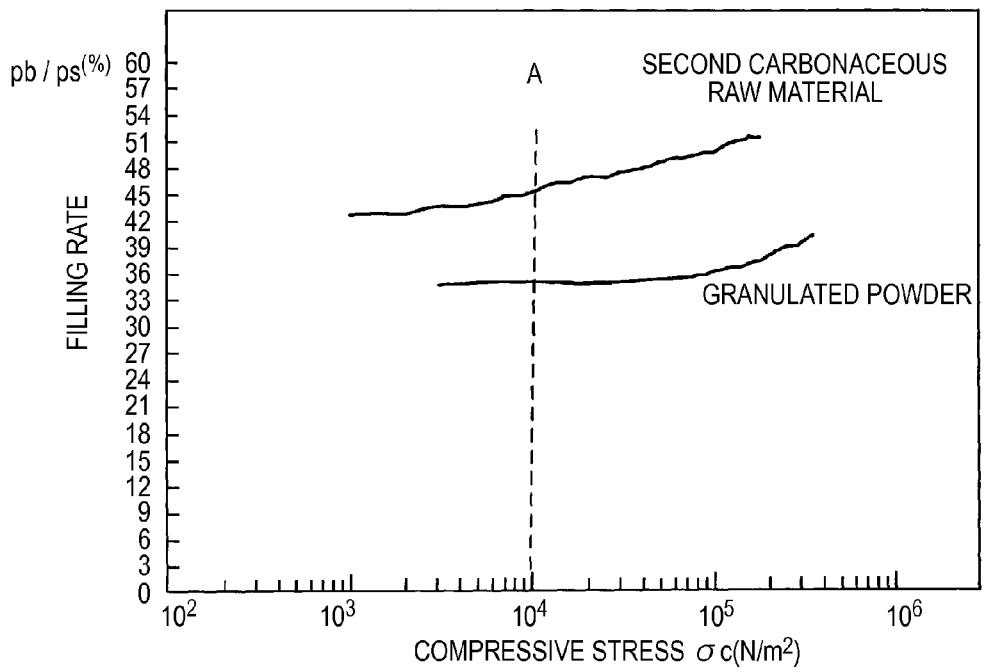
FIG. 6B is a graph showing respective relationships between the filling rate and compressive stress for the second carbonaceous raw material and the granulated powder in the illustrative embodiment of the invention.
Figure 13:
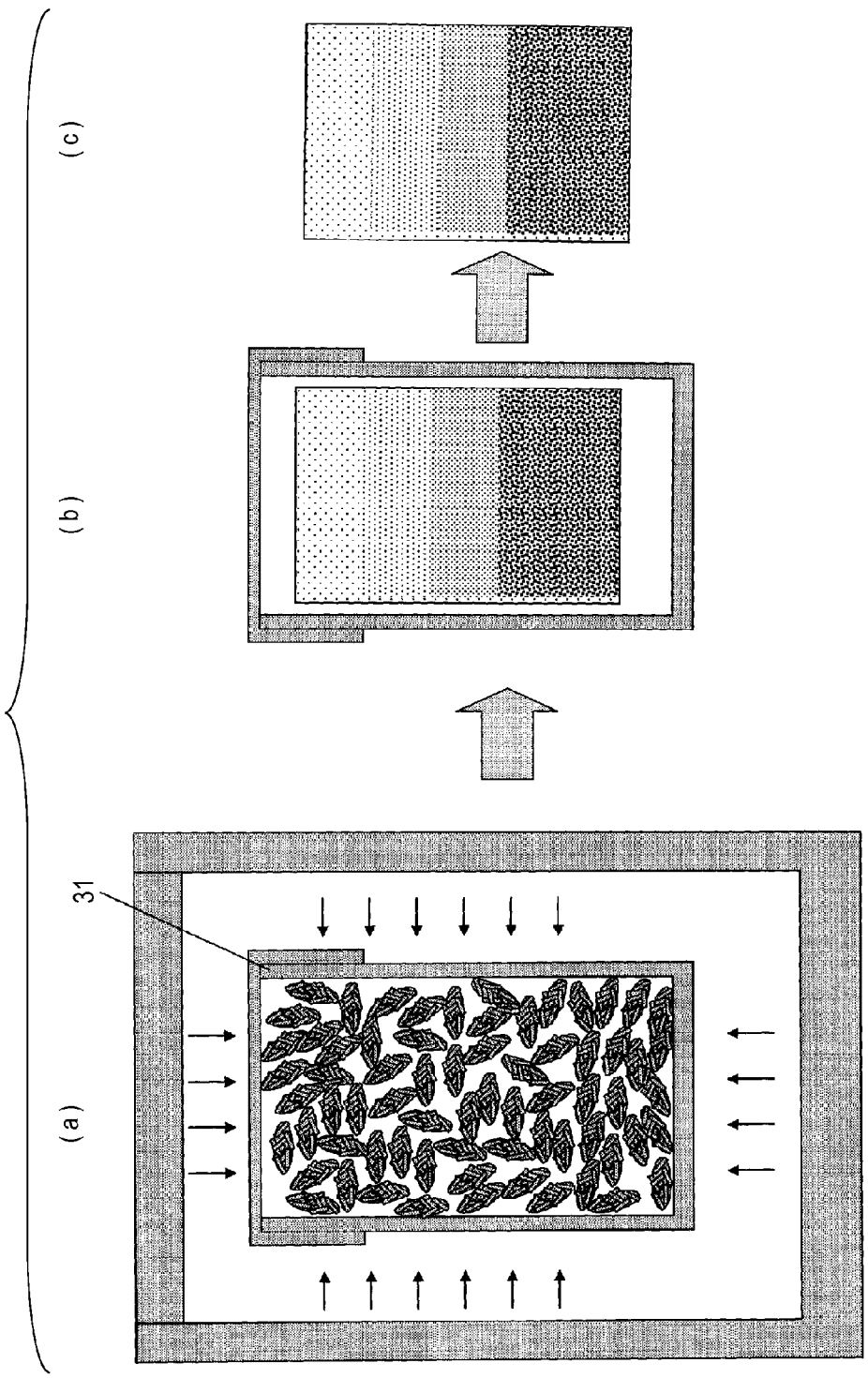
FIG. 13 is a view for explaining CIP molding of a second carbonaceous raw material in Comparative Example 1.

FIG. 1 is an explanatory view showing a method for producing a graphite material in an illustrative embodiment of the invention. FIG. 2A shows a polarization microscope photograph of a first carbonaceous raw material in an illustrative embodiment of the invention, FIG. 2B shows a polarization microscope photograph of a second carbonaceous raw material in the illustrative embodiment of the invention, and FIG. 2C shows a polarization microscope photograph of a granulated powder in the illustrative embodiment of the invention. FIGS. 2A, 2B and 2C were taken by a collimate method, connecting a camera to each of 100-, 50- and 12.5-power polarization microscopes. FIG. 3A is a schematic view showing a first carbonaceous raw material in an illustrative embodiment of the invention, FIG. 3B is a schematic view showing a second carbonaceous raw material in the illustrative embodiment of the invention, and FIG. 3C is a schematic view showing a granulated powder in the illustrative embodiment of the invention. FIGS. 4A and 4B are views for explaining a step of filling a granulated powder into a rubber case used in CIP molding in an illustrative embodiment of the invention, wherein FIG. 4A shows a state during filling, and FIG. 4B shows a state after filling. FIG. 5 is a view for explaining a step of subjecting a granulated powder to CIP molding in an illustrative embodiment of the invention. FIG. 6A is a graph showing respective relationships between compressive strain and compressive stress for a second carbonaceous raw material and a granulated powder in an illustrative embodiment of the invention, and FIG. 6B is a graph showing respective relationships between the filling rate and compressive stress for the second carbonaceous raw material and the granulated powder in the illustrative embodiment of the invention. FIGS. 12A and 12B are views for explaining a step of filling a second carbonaceous raw material into a rubber case used in CIP molding of Comparative Example 1, wherein FIG. 12A shows a state during filling, and FIG. 12B shows a state after filling. FIG. 13 is a view for explaining the step of CIP molding of a second carbonaceous raw material in Comparative Example 1.

The first carbonaceous raw material in the illustrative embodiment contains coke having a hexagonal crystal structure, although its crystallinity is low. For this reason, a coke powder obtained by pulverizing this coke is easily exfoliated in a c-axis direction of a hexagonal crystal, so that it is liable to be pulverized into a substantially plate shape or a substantially acicular shape as shown in FIG. 2A, resulting in a high aspect ratio. In the illustrative embodiment, pitch as a hydrophobic binding material 2 is first added to a first carbonaceous raw material 1 including coke powder (see FIG. 2A and FIG. 3A), followed by heat kneading to obtain a mixture. The mixture thus obtained is pulverized to obtain a second carbonaceous raw material 10 (see FIG. 2B and FIG. 3B). The second carbonaceous raw material 10 is formed by bonding the first carbonaceous raw material 1 having a high aspect ratio with the hydrophobic binding material 2, so that grains having a smaller aspect ratio than the first carbonaceous raw material are liable to be obtained. However, the second carbonaceous raw material 10 is obtained by pulverizing the mixture, so that it is liable to be pulverized along the direction of the first carbonaceous raw material 1. Accordingly, the aspect ratio once decreased is liable to be increased by pulverization. For such a reason, the second carbonaceous raw material is mainly composed of flattened grains and acicular grains. A hydrophilic binding material 20 is further added to the second carbonaceous raw material 10, followed by granulation using a solvent, thereby obtaining a granulated powder 100 which includes voids and is, for example, round (see FIG. 2C and FIG. 3C). Then, this granulated powder 100 is subjected to CIP molding to obtain a molded body, and thereafter, the molded body is burnt to graphitize it, thereby reducing anisotropy, which makes it possible to form a graphite material having high isotropy. The granulated powder 100 can form the graphite material having high isotropy, as long as it has a substantially flattened shape with an aspect ratio of about 2 or less, instead of a substantially round shape.

That is, the graphite material in an illustrative embodiment of the invention is formed according to the following steps, as shown in the flowchart in FIG. 1.

The hydrophobic binding material is added to the first carbonaceous raw material including coke powder, followed by heat kneading to obtain the mixture (S1: kneading step).

Then, the mixture obtained in the kneading step is pulverized to obtain the second carbonaceous raw material 10 (S2: pulverizing step).

The second carbonaceous raw material 10 obtained in the pulverizing step and the hydrophilic binding material 20 are granulated using the solvent to obtain the granulated powder (S3: granulating step).

The granulated powder obtained in the granulating step is subjected to the cold isostatic press molding to obtain a molded body (S4: molding step).

The molded body obtained in the molding step is burnt to obtain a burnt product (S5: burning step).

The burnt product obtained in the burning step is graphitized (S6: graphitizing step).

The respective steps will be described in detail below.

<S1: Kneading Step>

The first carbonaceous raw material in the illustrative embodiment, to which the hydrophobic binding material is added, is heat kneaded. For this reason, the first carbonaceous raw material is strongly bonded to the hydrophobic binding material by mechanical force. Accordingly, grains of the first carbonaceous raw material are strongly bonded to one another, so that the high-strength graphite material can be obtained.

As the hydrophobic binding material, pitch or tar is preferably used. Pitch or tar has a high carbonization yield, and moreover, is low in the content of impurities (such as metals, boron and silicon) which are liable to remain in the course of producing the graphite material. Accordingly, the high-purity and high-strength graphite material can be obtained.

Further, when the hydrophobic binding material such as pitch or tar is added to the first carbonaceous raw material, followed by heat kneading, in the kneading step, volatile portions are removed from the hydrophobic binding material, and the softening point of the hydrophobic binding material reaches about 150° C. to about 300° C. to cause an increase in hardness. For this reason, powder grains of the resultant second carbonaceous raw material 10 do not adhere to one another at room temperature, so that the texture of the resultant graphite material can be made fine, and therefore, the high-strength graphite material can be obtained.

As the first carbonaceous raw material in the illustrative embodiment, there can be used, for example, a powder obtained by pulverizing coke, anthracite, natural graphite, artificial graphite or the like. Among those, the coke contains large amounts of hydrogen, oxygen, nitrogen, sulfur and the like, besides carbon, and does not proceed in crystallization, so that it is conceivable to contain large amounts of functional groups such as unsaturated functional groups and oxygen-containing functional groups which are easily combined to the hydrophobic binding material. For this reason, the coke can be strongly bonded to the hydrophobic binding material, and therefore, the high-strength graphite material can be obtained.

As the coke, there can be utilized calcined coke such as coke obtained by only calcining coal, pitch coke obtained by coking and calcining pitch obtained from coke or petroleum coke, or a mixture thereof. Among those, the pitch coke is obtained using as a starting material pitch or tar obtained from a dry distilled gas of coal, so that it is low in solid impurities. Accordingly, there can be obtained the graphite material which is low in the content of foreign substances or voids from which foreign substances have been volatilized. Further, the petroleum coke is also low in the content of impurities because a starting material thereof is liquid, so that there can be obtained the graphite material which is low in the content of foreign substances or voids from which foreign substances have been volatilized.

The average grain size of the first carbonaceous raw material used in the kneading step is preferably from about 5 μm to about 20 μm. When the average grain size of the first carbonaceous raw material is about 5 μm or more, the hydrophobic binding material can fully cover a surface of the first carbonaceous raw material because of its small specific surface area. Accordingly, the amount of the hydrophobic binding material used can be decreased. Further, the amount of the hydrophobic binding material contained is small, so that it is possible to decrease the amount of a gas generated from the inside of the molded body by decomposition of the hydrophobic binding material in the subsequent burning step. This can prevent the molded body from being cracked by inner pressure due to the gas in the course of burning. When the average grain size of the first carbonaceous raw material is about 20 μm or less, the size of pores formed among the grains of the first carbonaceous raw material can be decreased. Accordingly, stress concentration around the pores becomes difficult to occur, and therefore, the high-strength graphite material can be obtained.

In the kneading step in the illustrative embodiment, the first carbonaceous raw material and the hydrophobic binding material are put, for example, into a heated kneader, and kneaded using a mixing blade. An aggregated mixture in which the surface of the first carbonaceous raw material is covered with the hydrophobic binding material is obtained by kneading.

<Step 2: Pulverizing Step>

In the pulverizing step in the illustrative embodiment, the aggregated mixture obtained in the kneading step is pulverized into a powder shape to obtain the second carbonaceous raw material 10. The average grain size of the second carbonaceous raw material 10 obtained in this pulverizing step is preferably from about 15 μm to about 50 μm, and preferably larger than the average grain size of the first carbonaceous raw material.

When the average grain size of the second carbonaceous raw material 10 is about 15 μm or more, the surface of the first carbonaceous raw material, which has no adhesive force, is difficult to be exposed on a surface of the second carbonaceous raw material 10. Accordingly, the high-strength graphite material is easily obtained. In other words, when pulverized to an average grain size of about 15 μm or more, the mixture obtained in the kneading step is not excessively pulverized. It can therefore be prevented that the first carbonaceous raw material and the hydrophobic binding material come apart by excessive pulverization. For this reason, the surface of the first carbonaceous raw material having no adhesive force is difficult to be exposed on the surface of the second carbonaceous raw material 10, so that the high-strength graphite material is easily obtained.

As described above, the average grain size of the second carbonaceous raw material 10 obtained in the pulverizing step is preferably about 50 µm or less. When the average grain size of the second carbonaceous raw material 10 is about 50 µm or less, large pores are difficult to be formed among the grains of the second carbonaceous raw material 10. Accordingly, the high-strength graphite material is easily obtained.

The pulverization may be performed by using any pulverizer as long as it is a dry type pulverizer. It is preferred to perform the pulverization using circulation type pulverizing equipment in which a pulverizer and a classifier are combined. When the pulverization is performed using the circulation type pulverizing equipment combined with the classifier, the pulverizer does not perform excessive pulverization. The surface of the first carbonaceous raw material having no adhesive force is difficult to be exposed on the surface of the second carbonaceous raw material 10, so that the high-strength graphite material is easily obtained.

<S3: Granulating Step>

In the granulating step in the illustrative embodiment, the second carbonaceous raw material 10 obtained in the pulverizing step is granulated using the hydrophilic binding material 20 to obtain the granulated powder. Accordingly, the hydrophobic binding material used in the kneading step and the hydrophilic binding material 20 are incompatible with each other. For this reason, the hydrophobic binding material and the hydrophilic binding material 20 can be differentiated in adhesive force. The hydrophobic binding material acts on strong grain-to-grain bonding of the first carbonaceous raw material 1, and the hydrophilic binding material 20 acts on weak grain-to-grain bonding of the second carbonaceous raw material 10. Further, the hydrophilic binding material 20 is a binding material for granulation, so that it bonds the second carbonaceous raw material 10 so as to form a substantially spherical shape to act so as to make it difficult to cause directionality to the granulated powder. For this reason, it is difficult to cause directionality to the graphite material produced through such a granulated powder, and therefore, the graphite material having low anisotropy can be obtained. Such a graphite material can be suitably utilized as graphite parts used at high temperature, because it is small in variations in its coefficient of thermal expansion depending on a cutting-out direction of the material. Further, use of such a graphite material as a graphite heater can reduce variations in the calorific value of the graphite heater, because it is small in variations in its specific resistance depending on a cutting-out direction of the material.

As the hydrophilic binding material 20 in the illustrative embodiment, a hydrophilic polymer is preferred. Impurities are difficult to remain in the course of producing the graphite material, because it is the polymer.

Furthermore, as the hydrophilic binding material 20, there can be used PVA (polyvinyl alcohol), CMC (carboxymethylcellulose), starch or the like.

The addition rate of the hydrophilic binding material 20 is preferably from about 0.1 to about 10.0 parts by weight based on 100 parts by weight of the second carbonaceous raw material 10. When the addition rate of the hydrophilic binding material 20 is less than about 0.1 part by weight based on 100 parts by weight of the second carbonaceous raw material 10, the binding force of the hydrophilic binding material becomes weak. Accordingly, the granulated powder becomes soft, and when filled into a filling container, the granulated powder becomes liable to be crushed under its own weight. When the granulated powder is crushed under the gravity and compressed, directionality becomes liable to be caused to the graphite material. For this reason, variations in the specific resistance or the coefficient of thermal expansion of the graphite material are increased. When the addition rate of the hydrophilic binding material 20 exceeds about 10.0 parts by weight based on 100 parts by weight of the second carbonaceous raw material, the amount of the aqueous solvent bonding to the hydrophilic binding material 20 is increased. It becomes therefore difficult to dry the granulated powder, which requires drying for a long period of time or at high temperature. For this reason, hydrophilic binding material becomes easily deteriorated by heat.

In the illustrative embodiment, the aqueous solvent refers to a solvent largely composed of water, and may include a solvent in which a surfactant, alcohol or the like is added to water.

The average grain size of the granulated powder in the illustrative embodiment is preferably from about 60 µm to about 1,000 µm. When the average grain size of the granulated powder in the illustrative embodiment is about 60 µm or more, the second carbonaceous raw material 10 is collected in large amounts, which make it possible to enlarge the granulated powder. Accordingly, the granulated powder having low directionality can be obtained. When the average grain size of the granulated powder in the illustrative embodiment is about 1,000 µm or less, the surface area to the volume is large, so that the aqueous solvent can be easily dried out.

Further, for the granulated powder, it is preferred to include a step of removing a fine powder having a grain size of less than about 15 µm. The granulated powder having a grain size of about 15 µm or more is small in specific surface area, because the grains have largely grown. For this reason, the aqueous solvent used at the time of granulation can be easily dried out for a short period of time, so that deterioration of the hydrophilic binding material by heat can be decreased. Methods for removing the fine powder having a grain size of less than about 15 µm from the granulated powder include utilization of a vibration sieve using ultrasonic vibration, an airflow classifier and the like.

In the illustrative embodiment, granulation is performed using a hydrophilic binding material and an aqueous solvent, so that the hydrophobic binding material which bonds the first carbonaceous raw material at the time of granulation is scarcely dissolved in the aqueous solvent. For this reason, at the time of granulation, the hydrophilic binding material does not allow the hydrophobic binding material 2 to be eluted from the surface of the first carbonaceous raw material or to be separated therefrom. On the other hand, the granulated powder 100 granulated by the hydrophilic binding material is molded, for example, into a substantially round shape, and the second carbonaceous raw material 10 is bonded in a state where it is isotropically arranged containing voids in the granulated powder. Then, this granulated powder 100 is formed by weak binding force of the hydrophilic binding material, so that it can be made easily crushable under pressure of the CIP molding. Accordingly, the voids in the inside of the granulated powder 100 are easily crushed, thereby being able to obtain the high-density molded body. The high-strength graphite material can be obtained, because of its fewer pores.

The grain size of the granulated powder 100 is larger than that of the second carbonaceous raw material 10, and large voids are present among the grains. In general, stress concentration is liable to occur around large voids, which become defects of the material to cause a large decrease in strength. The granulated powder 100 is easily crushed under molding pressure, so that large voids formed among the grains of the granulated powder are difficult to remain in the graphite material. For this reason, the molded body of the uniform, high-strength graphite material can be obtained. Further, the granulated powder is isotropically crushed in the CIP molding, so that the isotropic graphite material can be obtained.

It is preferred that the granulated powder in the illustrative embodiment has a compression failure strength of about 0.02 MPa to about 10.0 MPa.

Figure 10:
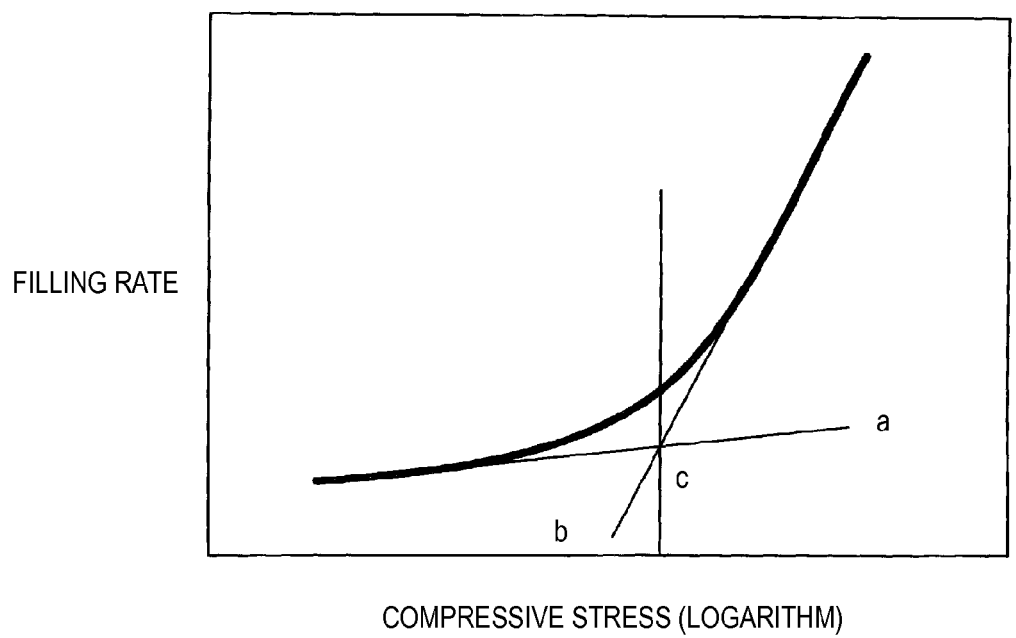
FIG. 10 is an explanatory view of compression failure strength of a powder, which is a graph showing a relationship between the compressive stress applied on the powder and a filling rate.
Figure 11:
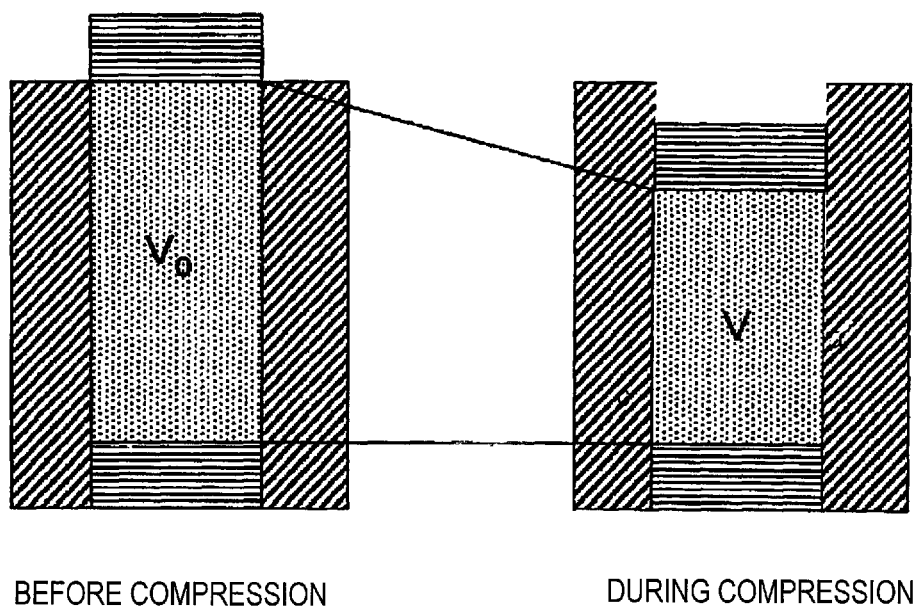
FIG. 11 is a schematic view showing an apparatus for measuring a filling rate, compressive stress and compressive strain of a powder.

FIG. 10 is an explanatory view of compression failure strength of a powder, which is a graph showing a relationship between the compressive stress applied on the powder and the filling rate. FIG. 11 is a schematic view showing an apparatus for measuring the filling rate, compressive stress and compressive strain of the powder.

A method for measuring the compression failure strength will be described with reference to FIG. 10 and FIG. 11. In FIG. 10, the ordinate indicates the filling rate of the powder, and the abscissa indicates the compressive stress (logarithmic axis) of the powder. Details will be described below.

(1) Measurement of Filling Rate: A sample is uniformly filled into a measuring cell with tapping, and a lid is placed thereon, followed by compression at a constant rate (see FIG. 11). At this time, the filling rate Vm can be calculated as $$Vm = \rho b / \rho p,$$

wherein ρb is the bulk density (mass/occupied volume V of granulated powder) of the sample, and ρp is the true density of the sample.

(2) Changes in the filling rate to the compressive stress are plotted on a single logarithmic graph of the filling rate (Y-axis)-the logarithm of the compressive stress (X-axis).

(3) When the sample is the granulated powder, the slope of the graph increases at a certain place in the course that the compressive stress increases. Approximate lines a and b are drawn at places before and after that place, and the compressive stress corresponding to an intersection c thereof is the compression failure strength (also referred to as the compression fracture strength).

The compression failure strength can be measured with a compression failure strength-tensile breaking strength measuring apparatus "AGGROBOT" manufactured by Hosokawa Micron Co., Ltd.

The compression failure strength is considered to be the compressive stress at which the filling rate starts to increase by crushing of the sample grains. It is considered that the granulated powder in the illustrative embodiment shows a compression behavior of the granulated powder at a compressive stress equal to or less than the compression failure strength, because the granulated powder is not broken, and shows a compression behavior of the second carbonaceous raw material 10 at a compressive stress exceeding the compression failure strength, because the hydrophilic binding material 20 bonding the second carbonaceous raw material 10 of the granulated powder is broken.

The range of the compression failure strength is preferably from about 0.02 MPa to about 10.0 MPa. In the filling container filled with the granulated powder, the gravity acts only in one direction. For this reason, when the granulated powder is compressed and crushed in the filling container by the gravity, an anisotropic material becomes liable to be formed at a place where the granulated powder has been crushed. When the compression failure strength is about 0.02 MPa or more, the granulated powder formed into a substantially spherical shape is difficult to be crushed by the gravity of the granulated powder in the filling container, and is isotropically crushed in the CIP molding. Accordingly, the resultant graphite material is difficult to generate anisotropy. When the compression failure strength is about 10.0 MPa or less, the granulated powder can be sufficiently crushed by the subsequent CIP molding. Accordingly, large pores derived from the size of the granulated powder are difficult to be formed, and therefore, the high-strength graphite is obtained. The granulated powder in the illustrative embodiment is obtained by weakly bonding the second carbonaceous raw material 10 in which the coke having few hydrophilic groups on the surface and mainly composed of aromatic rings and the hydrophobic binding material are strongly bonded to each other, with the hydrophilic binding material 20. For this reason, the granulated powder is easily crushed by the CIP molding, and after the granulated powder has been crushed, the grains of the second carbonaceous raw material 10 are strongly bonded to one another. Accordingly, the strong graphite material having low anisotropy can be obtained.

<S4: Molding Step>

In the molding step in the illustrative embodiment, the granulated powder obtained in the granulating step is filled into the filling container, and subjected to the cold isostatic press molding (CIP molding).

Although the molding pressure is not particularly limited, it is preferred to perform the molding at about 10 MPa to about 300 MPa. When the molding pressure is about 10 MPa or more, the grains of the second carbonaceous raw material 10 obtained from the granulated powder crushed can be strongly combined to one another. For this reason, the high-strength graphite material can be obtained. Even when the molding pressure is increased to a molding pressure exceeding about 300 MPa, the density of the molded body is little changed. Accordingly, the molded body having a sufficient density can be obtained at a molding pressure of about 300 MPa or less.

Although the filling container may be any, there can be used, for example, a case made of rubber (rubber case).

The second carbonaceous raw material 10 obtained by pulverizing the mixture is pulverized along the first carbonaceous raw material 1 at the time of pulverization (S2: pulverizing step), and a part of the first carbonaceous raw material 1 is also cleaved. For this reason, the second carbonaceous raw material 10 has an aspect ratio of about 2 to about 10. Usually, in the CIP molding, pressure is isotropically applied by a pressurizing medium such as water, so that it is characterized in that anisotropy is difficult to occur in the course of molding (S5: molding step). However, in the case where a large block thereof is molded, it is considered that even when the CIP molding is used, uniaxial molding is performed by its own weight of the second carbonaceous raw material 10, at the time of filling into the rubber case, particularly in a lower portion of the rubber case, as described above, resulting in a partial increase in anisotropy.

Characteristics of the production method (molding) of the graphite material thus obtained will be described with reference to FIG. 4 and FIG. 12. FIGS. 4A and 4B are views for explaining the step of filling the granulated powder into the rubber case used in the CIP molding in the illustrative embodiment, wherein FIG. 4A shows a state during filling, and FIG. 4B shows a state after filling. FIGS. 12A and 12B are views for explaining the step of filling the second carbonaceous raw material into a rubber case used in a related-art CIP molding (Comparative Example 1), wherein FIG. 12A shows a state during filling and FIG. 12B shows a state after filling. First, in the case of a production method of a graphite material in a related-art example (Comparative Example 1 described later), compression by its own weight of the second carbonaceous raw material 10 is low in an upper portion of the rubber case 31 at the time of filling of the second carbonaceous raw material 10, as shown in FIGS. 12A and 12B, so that directionality due to the carbonaceous raw material is difficult to be caused, and therefore, anisotropy is difficult to occur. On the other hand, in the lower portion of the rubber case 31 at the time of filling of the second carbonaceous raw material 10, the second carbonaceous raw material 10 is compressed by its own weight in one direction, so that directionality is caused to cause the occurrence of bias in anisotropy in the material, and therefore, anisotropy is liable to occur.

In contrast, in the illustrative embodiment, the granulated powder 100 obtained by further adding the hydrophilic binding material 20 to the second carbonaceous raw material 10 and granulating them is filled into the rubber case 31, as shown in FIGS. 4A and 4B. The granulated powder 100 has such a compression failure strength that the granulated powder is not crushed by its own weight in the filling container (preferably from about 0.02 MPa to about 10.0 MPa). For this reason, the granulated powder 100 is difficult to be crushed by its own weight. In the case where such a granulated powder 100 is pressurized together with the rubber case 31 (filling container) in which the granulated powder is filled in the CIP molding, when a pressure corresponding to the compression failure strength is applied, the granulated powder 100 is crushed and molded. At this time, the pressure corresponding to the compression failure strength is larger than the pressure due to its own weight of the granulated powder 100, so that the granulated powder is scarcely uniaxially pressurized and is isotropically molded. Accordingly, the graphite material having low anisotropy over the whole material of the molded body can be obtained.

Further detailed description will be made with reference to FIG. 6A. FIG. 6A is a graph showing respective relationships between compressive strain and compressive stress for the second carbonaceous raw material 10 and the granulated powder in the illustrative embodiment. The respective relationships between compressive strain and compressive stress for the second carbonaceous raw material 10 and the granulated powder in the illustrative embodiment, which are shown in FIG. 6A, can be measured using an apparatus shown in FIG. 11.

A sample (each of the second carbonaceous raw material 10 and the granulated powder) to be measured is uniformly filled into a measuring cell with tapping, and a lid is placed thereon, followed by compression at a constant rate. The pressure applied on the lid at this time is the compressive stress. The compressive strain $\epsilon$ can be obtained according to the following calculating formula from the volume $V_0$ of the sample before pressurization and the volume V thereof during pressurization.

$$\epsilon = (V_0 - V)/V_0$$

The compressive stress and the resultant compressive strain are plotted to obtain a graph showing the respective relationships between compressive strain and compressive stress for the second carbonaceous raw material 10 and the granulated powder in the illustrative embodiment, which are shown in FIG. 6A.

The second carbonaceous raw material 10 and the granulated powder are both produced using the first carbonaceous raw material 1, so that the bulk density thereof is from about 0.6 g/cm$^3$ to about 0.7 g/cm$^3$ (confirmed by the present inventors). For this reason, in the case where the second carbonaceous raw material 10 in the illustrative embodiment is filled, for example, into the rubber case having a height of 1,400 mm, and in the case where the granulated powder in the illustrative embodiment is filled thereinto, the pressure applied thereby on the lower portion of the rubber case is approximately equivalent, and the value thereof is from about 8 kPa to about 10 kPa. In FIG. 6A, A indicates the pressure applied on the lower portion of the filling container having a height of about 1,400 mm by its own weight of the second carbonaceous raw material 10 (or the granulated powder).

From the graph of FIG. 6A, a compressive strain (d) of slightly less than 1% is confirmed in the lower portion of the rubber case 31, when the granulated powder in the illustrative embodiment is filled into the rubber case 31 having a height of 1,400 mm, whereas a compressive strain (e) of 7% is confirmed, when the second carbonaceous raw material 10 is filled into the rubber case 31 having a height of 1,400 mm. For this reason, it can be confirmed that the compressive strain due to its own weight of the powder is decreased by forming the granulated powder using the hydrophilic binding material 20 from the second carbonaceous raw material 10.

Further description will be made with reference to FIG. 6B. FIG. 6B is a graph showing respective relationships between the filling rate and compressive stress for the second carbonaceous raw material 10 and the granulated powder in the illustrative embodiment. The respective relationships between the filling rate and compressive stress for the second carbonaceous raw material 10 and the granulated powder in the illustrative embodiment, which are shown in FIG. 6B, can be measured using the apparatus shown in FIG. 11.

A sample (each of the second carbonaceous raw material 10 and the granulated powder) to be measured is uniformly filled into a measuring cell with tapping, and a lid is placed thereon, followed by compression at a constant rate. The pressure applied on the lid at this time is the compressive stress. The filling rate Vm can be calculated as $$Vm = \rho b / \rho p,$$

wherein $\rho b$ is the bulk density (mass/occupied volume V of granulated powder) of the sample, and $\rho p$ is the true density of the sample.

The compressive stress and the resultant filling rate are plotted to obtain a graph showing the respective relationships between the filling rate and compressive stress for the second carbonaceous raw material 10 and the granulated powder in the illustrative embodiment, which are shown in FIG. 6B.

In FIG. 6B, A indicates the pressure applied on the lower portion of the filling container having a height of about 1,400 mm by its own weight of the second carbonaceous raw material (or the granulated powder). As described above, in the case where the second carbonaceous raw material 10 in the illustrative embodiment is filled into the rubber case having a height of 1,400 mm, and in the case where the granulated powder in the illustrative embodiment is filled thereinto, the pressure applied thereby on the lower portion of the rubber case is approximately equivalent, and the value thereof is from about 8 kPa to about 10 kPa. In the case of the granulated powder in this illustrative embodiment, the filling rate scarcely changes in a region of the powder pressure (about 8 kPa to about 10 kPa) applied on the lower portion of the rubber case. On the other hand, in the case of the second carbonaceous raw material 10 in this illustrative embodiment, it is confirmed that the filling rate increases in proportion to the pressure in a region of the powder pressure (about 8 kPa to about 10 kPa) applied on the lower portion of the rubber case. For this reason, it can be confirmed that the granulated powder becomes difficult to be crushed, resulting in a decrease in the compressive strain due to its own weight of the powder, by forming the granulated powder using the hydrophilic binding material 20 from the second carbonaceous raw material 10.

<S5: Burning Step>

The molded body obtained in the molding step is burnt in an inert gas or reducing gas atmosphere. The inert gas includes nitrogen, argon, helium and the like, and the reducing gas includes hydrocarbon gas, hydrogen, carbon monoxide and the like. In order to form such an atmosphere, such gas is introduced in a burning furnace, and the molded body is burnt.

In the case of the reducing atmosphere, the molded body may be placed in a burning can made of a metal such as stainless steel or a ceramic such as alumina, followed by putting a lid thereon, and burnt in such a manner that the external air does not enter the inside thereof. In this way, the reducing gas atmosphere is formed by hydrocarbon gas or carbon monoxide gas generated from the molded body, thereby being able to prevent oxidation of a burnt body. Further, when the molded body is placed in the burning can and burnt, the molded body is embedded in packing coke having a thickness of several millimeters and burnt, whereby it can be prevented that the external air of the burning can reaches the molded body to oxidize the burnt body.

Furthermore, reducing gas such as hydrocarbon gas or carbon monoxide gas is allowed to be generated by covering the packing coke with carbonaceous powder or grains containing volatiles, such as green coke or hard pitch, whereby it can be prevented that the external air of the burning can reaches the molded body to oxidize the burnt body.

The treatment temperature in the burning step is not particularly limited. In a temperature region from room temperature (about 25° C.) to about 700° C., an extremely large amount of cracked gas is generated, so that it is desirable to perform the burning in a burning furnace which can comply with exhaust of the cracked gas. When the molded body is burnt in a temperature region from room temperature (about 25° C.) to about 1,200° C., volatiles of the molded body sufficiently come out and carbonization proceeds. Thus, the volatiles are removed, so that gas generated in the subsequent graphitization can be more decreased.

The rate of temperature increase at the time of the burning may be appropriately selected according to the size of the molded body. In the case of the molded body of approximately 30×50×150 mm, cracking can be made difficult to occur, for example, by burning it with a rate of temperature increase of about 20° C./H, because thermal strain in the inside of the burnt body can be decreased. In the case of the molded body of approximately 300×600×1,000 mm, cracking can be made difficult to occur, for example, by decreasing the rate of temperature increase to about 2° C./H, because thermal strain in the inside of the burnt body can be decreased.

In this burning step, most of the hydrophilic binding material 20 is thermally decomposed to be gasified. For this reason, carbon derived from the hydrophilic binding material 20 is almost gasified to disappear, partly for that the content thereof is originally small (about 10 parts by weight or less based on 100 parts by weight of the second carbonaceous raw material). Thus, the hydrophilic binding material has a small effect on the binding force of the coke, and is difficult to decrease the strength of the graphite material.

<S6: Graphitizing Step>

Following the burning step, the molded body burnt is further heat treated at a high temperature to graphitize it. The treatment temperature of the graphitization is not particularly limited, and appropriately selected depending on the use of the graphite material. For example, the graphitization can be performed in a temperature range of about 2,000° C. to about 3,400° C. When the heat treatment is performed at about 2,000° C. or more, crystallization of graphite proceeds to cause the graphite material to be softened, thereby being able to easily process it. Such a graphite material can be used for parts for semiconductor production equipment, a positioning jig for electronic parts, or the like, which requires fine processing. When the heat treatment temperature is about 3,400° C. or less, it is apart from the sublimation temperature of graphite (about 3,650° C.). Accordingly, the amount of a graphite surface sublimated is small, so that energy is difficult to be consumed by the sublimation, and therefore, the temperature can be easily increased.

Although the graphitization may be performed by any method, there can be used an Acheson furnace in which the burnt body is embedded in the furnace, and electricity is turned on from an electrode to the burnt body to generate heat, an induction furnace in which an induced current is allowed to pass through the burnt body by an induction coil to generate heat, or the like.

<S7: Impregnation Step>

In order to increase the density of the graphite material, to decrease the specific resistance thereof and to increase the thermal conductivity thereof, an impregnation step may be added between the burning step and the graphitizing step. The impregnation step is performed by placing the burnt body obtained by burning the molded body in an autoclave, followed by vacuuming and heating, thereafter introducing molten pitch therein, and impregnating the burnt body by applying pressure by using a gas such as nitrogen gas. The burnt body is taken out of the pitch, and burnt in the same manner as in the burning step.

The impregnation step may be performed either once or plural times. The temperature of the autoclave at the time of impregnation is not particularly limited, as long as the pitch is melted. However, the impregnation can be performed, for example, at a temperature of about 150° C. to about 300° C. Although the pressure of impregnation is not particularly limited, the impregnation is performed, for example, at about 4 MPa.

FIGS. 7A to 7C are flow charts showing steps of Examples and Comparative Examples, FIG. 8 is a table showing production parameters of Examples and Comparative Examples, and FIG. 9 is a table showing the measurement results of graphite obtained by methods of Examples and Comparative Examples. In FIG. 8, HGI indicates the Hardgrove index and shows the grindability index of coke (JIS M8801). The temperature of kneading indicates the maximum temperature reached at the time of kneading. In FIG. 8, Dp50 indicates the grain size at a point where a distribution curve of integrated % crosses the abscissa of 50%. Specifically, it can be obtained by measurement with a laser diffraction type grain size distribution meter. In FIG. 9, CTE indicates the coefficient of thermal expansion in a temperature range of 50 to 400° C.

EXAMPLE 1

Example 1 will be described.

<51: Kneading Step>

In a kneader heated to 210° C. by heat medium oil, 100 parts by weight of calcined coke powder (a first carbonaceous raw material) and 287 parts by weight of pitch (a hydrophobic binding material) were added, followed by kneading. The calcined coke had a Dp50 of 14.7 μm and a HGI of 28. Kneading was continued for 2 hours, and a mixture kneaded was taken out. At the time of kneading, the mixture reached a maximum temperature of 251° C.

<S2: Pulverizing Step>

The mixture was pulverized by a pulverizer to obtain a second carbonaceous raw material 10. As shown in FIG. 2, the second carbonaceous raw material 10 is formed by bonding the first carbonaceous raw material 1 composed of the coke with the hydrophobic binding material 2 composed of the pitch. The second carbonaceous raw material had a Dp50 of 27.7 μm.

<S3: Granulating Step>

The second carbonaceous raw material 10 was dispersed in an aqueous solvent, and PVA (polyvinyl alcohol) was added as a hydrophilic binding material 20. The respective ratios thereof were 100 parts by weight for the second carbonaceous raw material, 100 parts by weight for water and 1.0 part by weight for PVA. Further, because the second carbonaceous raw material is hydrophobic, a surfactant (0.1 part by weight of polyalkylene glycol) was added in order to increase solubility thereof in the aqueous solvent, followed by slurrying with stirring.

The slurry thus obtained was sprayed in a drying chamber of 110° C. by a spray dry method to perform granulation. Incidentally, from the resultant granulated powder 100, grains of 15 μm or more in size were classified by an air classifier, and grains of 800 μm or less in size were classified by a vibration sieve. Thus, a granulated powder having a grain size of 15 to 800 μm was obtained.

The granulated powder had a Dp50 of 203 μm and a compression failure strength of 93.7 kPa (0.0937 MPa).

<S4: Molding Step>

The granulated powder 100 obtained in the granulating step was filled into a rubber case (rubber bag) 31 having an inside dimension of 900×450×1,400 mm high, as shown in FIGS. 4A and 4B, and allowed to stand for 8 hours. Incidentally, in Example 1, sinking of the granulated powder 100 was not observed after standing, and there was no compression due to the gravity of the granulated powder. After standing, the granulated powder 100 in an upper portion of the rubber case 31 was flattened, and thereafter, a rubber lid was placed on the case to seal it, followed by CIP molding under a pressure of 100 MPa ((a), (b) and (c) of FIG. 5). After the molding, the rubber case 31 was opened to obtain a molded body 40.

<S5: Burning Step>

The molded body obtained in the step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.

<S6: Graphitizing Step>

The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace.

EXAMPLE 2

Example 2 will be described below.

<S1: Kneading Step>

In a kneader heated to 210° C. by heat medium oil, 100 parts by weight of calcined coke powder (a first carbonaceous raw material) and 287 parts by weight of pitch (a hydrophobic binding material) were added, followed by kneading. The calcined coke had a Dp50 of 14.7 μm and a HGI of 28. Kneading was continued for 2 hours, and a mixture kneaded was taken out. At the time of kneading, the mixture reached a maximum temperature of 261° C.

<S2: Pulverizing Step>

The mixture was pulverized by a pulverizer to obtain a second carbonaceous raw material 10. As shown in FIG. 2, the second carbonaceous raw material 10 is formed by bonding the first carbonaceous raw material 1 composed of the coke with the hydrophobic binding material 2 composed of the pitch. The second carbonaceous raw material had a Dp50 of 28.2 μm.

<S3: Granulating Step>

The second carbonaceous raw material 10 was dispersed in an aqueous solvent, and PVA (polyvinyl alcohol) was added as a hydrophilic binding material 20. The respective ratios thereof were 100 parts by weight for the second carbonaceous raw material, 100 parts by weight for water and 1.0 part by weight for PVA. Further, because the second carbonaceous raw material is hydrophobic, a surfactant (0.1 part by weight of polyalkylene glycol) was added in order to increase solubility thereof in the aqueous solvent, followed by slurrying with stirring.

The slurry thus obtained was sprayed in a drying chamber of 110° C. by a spray dry method to perform granulation. Incidentally, from the resultant granulated powder 100, grains of 15 μm or more in size were classified by an air classifier, and grains of 800 μm or less in size were classified by a vibration sieve. Thus, a granulated powder having a grain size of 15 to 800 μm was obtained.

The granulated powder had a Dp50 of 261 μm and a compression failure strength of 95.7 kPa (0.0957 MPa).

<S4: Molding Step>

The granulated powder 100 obtained in the granulating step was filled into a rubber case (rubber bag) 31 having an inside dimension of 900×450×1,400 mm high, as shown in FIGS. 4A and 4B, and allowed to stand for 8 hours. Incidentally, in Example 2, sinking of the granulated powder 100 was not observed after standing, and there was no compression due to the gravity of the granulated powder. After standing, the granulated powder 100 in an upper portion of the rubber case 31 was flattened, and thereafter, a rubber lid was placed on the case to seal it, followed by CIP molding under a pressure of 100 MPa ((a), (b) and (c) of FIG. 5). After the molding, the rubber case 31 was opened to obtain a molded body 40.

<S5: Burning Step>

The molded body obtained in the molding step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.

<S6: Graphitizing Step>

The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace.

EXAMPLE 3

Example 3 will be described below.
<S1: Kneading Step>

In a kneader heated to 210° C. by heat medium oil, 100 parts by weight of calcined coke powder (a first carbonaceous raw material) and 287 parts by weight of pitch (a hydrophobic binding material) were added, followed by kneading. The calcined coke had a Dp50 of 15.2 µm and a HGI of 34. Kneading was continued for 2 hours, and a mixture kneaded was taken out. At the time of kneading, the mixture reached a maximum temperature of 253° C.

<S2: Pulverizing Step>

The mixture was pulverized by a pulverizer to obtain a second carbonaceous raw material 10. As shown in FIG. 2, the second carbonaceous raw material 10 is formed by bonding the first carbonaceous raw material 1 composed of the coke with the hydrophobic binding material 2 composed of the pitch. The second carbonaceous raw material had a Dp50 of 26.7 µm.

<S3: Granulating Step>

The second carbonaceous raw material 10 was dispersed in an aqueous solvent, and PVA (polyvinyl alcohol) was added as a hydrophilic binding material 20. The respective ratios thereof were 100 parts by weight for the second carbonaceous raw material, 100 parts by weight for water and 1.0 part by weight for PVA. Further, because the second carbonaceous raw material is hydrophobic, a surfactant (0.1 part by weight of polyalkylene glycol) was added in order to increase solubility thereof in the aqueous solvent, followed by slurrying with stirring.

The slurry thus obtained was sprayed in a drying chamber of 110° C. by a spray dry method to perform granulation. Incidentally, from the resultant granulated powder 100, grains 15 µm or more in size were classified by an air classifier, and grains of 800 µm or less in size were classified by a vibration sieve. Thus, a granulated powder having a grain size of 15 to 800 µm was obtained.

The granulated powder had a Dp50 of 231 µm and a compression failure strength of 96.2 kPa (0.0962 MPa).

<S4: Molding Step>

The granulated powder 100 obtained in the granulating step was filled into a rubber case (rubber bag) 31 having an inside dimension of 900×450×1,400 mm high, as shown in FIGS. 4A and 4B, and allowed to stand for 8 hours. Incidentally, in Example 3, sinking of the granulated powder 100 was not observed after standing, and there was no compression due to the gravity of the granulated powder. After standing, the granulated powder 100 in an upper portion of the rubber case 31 was flattened, and thereafter, a rubber lid was placed on the case to seal it, followed by CIP molding under a pressure of 100 MPa ((a), (b) and (c) of FIG. 5). After the molding, the rubber case 31 was opened to obtain a molded body 40.

<S5: Burning Step>

The molded body obtained in the molding step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.

<S6: Graphitizing Step>

The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace.

Comparative Examples will be described bellow.

In Comparative Examples 1 and 2, the granulating step using the aqueous solvent (the granulating step S3 of Examples 1 to 3) was omitted. The other steps were the similar to the above illustrative embodiment.

COMPARATIVE EXAMPLE 1

Comparative Example 1 will be described below.
<S1: Kneading Step>

In a kneader heated to 210° C. by heat medium oil, 100 parts by weight of calcined coke (a first carbonaceous raw material) and 287 parts by weight of pitch (a hydrophobic binding material) were added, followed by kneading. The calcined coke had a Dp50 of 14.1 µm and a HGI of 31. Kneading was continued for 2 hours, and a mixture kneaded was taken out. At the time of kneading, the mixture reached a maximum temperature of 257° C. This kneading step S1 is similar to Examples.

<S2: Pulverizing Step>

The mixture was pulverized by a pulverizer to obtain a second carbonaceous raw material 10. As shown in FIG. 2, the second carbonaceous raw material 10 is formed by bonding the first carbonaceous raw material 1 composed of the coke with the hydrophobic binding material 2 composed of the pitch. The second carbonaceous raw material had a Dp50 of 25.6 µm. The compression failure strength could not be detected because there was no abrupt change in filling rate to compressive stress.

<S4: Molding Step>

The second carbonaceous raw material 10 obtained in the pulverizing step was filled into a rubber case (rubber bag) 31 having an inside dimension of 900×450×1,400 mm high, as shown in FIG. 11, and allowed to stand for 8 hours.

Incidentally, in the second carbonaceous raw material 10 filled, sinking of about 100 mm was observed after standing. This is considered because the second carbonaceous raw material 10 filled in a lower portion of the rubber case was compressed by the gravity thereof. After standing, the second carbonaceous raw material 10 in an upper portion of the rubber case 31 was flattened, and thereafter, a rubber lid was placed on the case to seal it, followed by CIP molding under a pressure of 100 MPa ((a), (b) and (c) of FIG. 13). After the molding, the rubber case 31 was opened to obtain a molded body 40.

<S5: Burning Step>

The molded body obtained in the molding step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.

<S6: Graphitizing Step>

The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace. This graphitizing step S6 is similar to Example 1.

COMPARATIVE EXAMPLE 2

Comparative Example 2 will be described below.
<S1: Kneading Step>
In a kneader heated to 210° C. by heat medium oil, 100 parts by weight of calcined coke (a first carbonaceous raw material) and 287 parts by weight of pitch (a hydrophobic binding material) were added, followed by kneading. The calcined coke had a Dp50 of 14.5 μm and a HGI of 25. Kneading was continued for 2 hours, and a mixture kneaded was taken out. At the time of kneading, the mixture reached a maximum temperature of 255° C. This kneading step S1 is similar to Examples.
<S2: Pulverizing Step>
The mixture was pulverized by a pulverizer to obtain a second carbonaceous raw material 10. As shown in FIG. 2, the second carbonaceous raw material 10 is formed by bonding the first carbonaceous raw material 1 composed of the coke with the hydrophobic binding material 2 composed of the pitch. The second carbonaceous raw material had a Dp50 of 26.3 μm. The compression failure strength could not be detected because there was no abrupt change in filling rate to compressive stress.
<S4: Molding Step>
The second carbonaceous raw material 10 obtained in the pulverizing step was filled into a rubber case (rubber bag) 31 having an inside dimension of 500 mm diameter×1,500 mm high, as shown in FIG. 11, and allowed to stand for 8 hours. Incidentally, in the second carbonaceous raw material 10 filled, sinking of about 100 mm was observed after standing. This is considered because the second carbonaceous raw material 10 filled in a lower portion of the rubber case was compressed by the gravity thereof. After standing, the second carbonaceous raw material 10 in an upper portion of the rubber case 31 was flattened, and thereafter, a rubber lid was placed on the case to seal it, followed by CIP molding under a pressure of 100 MPa ((a), (b) and (c) of FIG. 13). After the molding, the rubber case 31 was opened to obtain a molded body 40.
<S5: Burning Step>
The molded body obtained in the molding step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.
<S6: Graphitizing Step>
The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace. This graphitizing step S6 is similar to Example 1.

COMPARATIVE EXAMPLE 3

Comparative Example 3 will be described below.
Comparative Example 3 includes the granulating step of using an aqueous solvent and granulating the first carbonaceous raw material using the aqueous solvent and the hydrophilic binding material 20, the kneading step S1 of adding the hydrophobic binding material and performing kneading to obtain a mixture, the pulverizing step S2, the molding step S4, the burning step S5 and the graphitizing step S6. That is, the granulating step of performing granulation using the aqueous solvent and the hydrophilic binding material 20 is the step of granulating the first carbonaceous raw material before the kneading step S1. There is no granulating step after the kneading step.

That is, Comparative Example 3 is different from Examples 1 to 3 in that the kneading step S1 and the pulverizing step S2 are performed after the granulating step of the first carbonaceous raw material has been performed in place of the granulating step S3. Compared to Comparative Examples 1 and 2 in which the granulating step S3 is omitted, Comparative Example 3 is different in that the granulating step of the first carbonaceous raw material is performed first.
<Granulating Step>
A first carbonaceous raw material was dispersed in an aqueous solvent, and PVA (polyvinyl alcohol) was added as a hydrophilic binding material 20. The respective ratios thereof were 100 parts by weight for calcined coke (the first carbonaceous raw material), 100 parts by weight for water and 1.0 part by weight for PVA. Further, because the first carbonaceous raw material is hydrophobic, a surfactant (0.1 part by weight of polyalkylene glycol) was added in order to increase solubility thereof in the aqueous solvent, followed by slurrying.

The slurry thus obtained was sprayed in an apparatus of 110° C. by a spray dry method to perform granulation, thereby obtaining the granulated first carbonaceous raw material. The calcined coke before granulation had a Dp50 of 14.4 μm and a HGI of 31.
<S1: Kneading Step>
In a kneader heated to 210° C. by heat medium oil, 100 parts by weight of the granulated first carbonaceous raw material and 287 parts by weight of pitch (a hydrophobic binding material) were added, followed by kneading. Kneading was continued for about 2 hours, and the contents were taken out. At the time of kneading, the mixture reached a maximum temperature of 255° C.
<S2: Pulverizing Step>
The mixture was pulverized by a pulverizer to obtain a carbonaceous raw material bonded with the hydrophobic binding material. The carbonaceous raw material bonded with the hydrophobic binding material in this Comparative Example is formed by bonding the first carbonaceous raw material 1 composed of the coke granulated with the hydrophilic binding material 20 with the hydrophobic binding material composed of the pitch. The carbonaceous raw material bonded with the hydrophobic binding material had a Dp50 of 27.2 μm. The compression failure strength could not be detected because there was no abrupt change in filling rate to compressive stress.
<S4: Molding Step>
The carbonaceous raw material bonded with the hydrophobic binding material, which was obtained in the pulverizing step, was filled into a rubber case (rubber bag) 31 having an inside dimension of 500 mm diameter×1,500 mm high, and allowed to stand for 8 hours. Incidentally, in the carbonaceous raw material bonded with the hydrophobic binding material, which was filled into the rubber case, sinking of about 100 mm was observed after standing. This is considered because the carbonaceous raw material bonded with the hydrophobic binding material, which was filled in a lower portion of the rubber case, was compressed by the gravity thereof. After standing, the granulated powder 100 in an upper portion of the rubber case 31 was flattened, and thereafter, a rubber lid was placed on the case to seal it, followed by CIP molding under a pressure of 100 MPa ((a), (b) and (c) of FIG. 13). After the CIP molding, the rubber case 31 was opened to obtain a molded body 40.

<S5: Burning Step>

The molded body obtained in the molding step was put into a burning can made of stainless steel, and covered with packing coke composed of coke grains having a grain size of 5 mm or less. Further, a surface layer thereof was covered with volatile green coke, and thereafter, a lid made of stainless steel was placed thereon, followed by burning at 900° C. The temperature was increased from room temperature (25° C.) taking 28 days, and kept at 900° C. for 16 hours.

<S6: Graphitizing Step>

The burnt body obtained in the burning step was placed in an Acheson furnace, and heated to 2,500° C. to graphitize it. From room temperature (about 25° C.) to 1,500° C., the temperature was increased at an approximately constant rate taking 5 days, and from 1,500° C. to 2,500° C., the temperature was increased for 2 days increasing a power output of the furnace.

The respective production parameters of Examples 1 to 3 and Comparative Examples 1 to 3 are collectively shown in the table of FIG. 8.

For each of the graphite materials thus obtained, the bulk specific gravity, Shore hardness, bending strength, specific resistance and CTE at upper, central and lower positions of the graphite material were measured. The results thereof are collectively shown in the table of FIG. 9.

Incidentally, specimens of 8 mm diameter×80 mm were cut out from the upper, central and lower positions of the resultant graphite material to prepare samples for evaluation. The bulk density was measured from the diameter, length and mass of each specimen of 8 mm diameter×80 mm.

Then, for the above-mentioned specimens, the Shore hardness was measured by a Shore hardness tester.

Next, a constant current of 1 A was allowed to flow in a longitudinal direction of each specimen (8 mm diameter×80 mm) described above, and the voltage drop between two points 1 cm apart near the center of the specimen was measured to determine the specific resistance of the specimen. The specific resistance was determined from the following equation:

Specific resistance=(voltage drop×cross-sectional area)/(current×measuring distance of voltage drop)

The three-point bending strength was measured using an Autograph AG-IS (5kN) manufactured by Shimadzu Corporation.

Further, the CTE (coefficient of thermal expansion) was measured as follows.

A specimen of 4 mm diameter×20 mm was processed from each specimen (8 mm diameter×80 mm) described above, and the CTE was measured using a thermal dilatometer (DLY-1500) manufactured by Rigaku Corporation. The measuring range was from 50 to 400° C., and the CTE was calculated by dividing the rate of extension over this range by 350° C. (400° C.-50° C.).

The anisotropic ratios of the specific resistance at the respective positions in Examples 1 to 3 and Comparative Examples 1 to 3 were as follows:

The specific resistance at the upper position in Example 1 was 1.44 mΩcm in the AG direction and 1.43 mΩcm in the WG direction, and anisotropic ratio=maximum value (1.44)/minimum value (1.43)−1=0.7%.

The specific resistance at the lower position in Example 1 was 1.40 mΩcm in the AG direction and 1.42 mΩcm in the WG direction, and anisotropic ratio=maximum value (1.42)/minimum value (1.40)−1=1.4%.

The specific resistance at the upper position in Example 2 was 1.43 mΩcm in the AG direction and 1.43 mΩcm in the WG direction, and anisotropic ratio=maximum value (1.43)/minimum value (1.43)−1=0.0%.

The specific resistance at the lower position in Example 2 was 1.42 mΩcm in the AG direction and 1.45 mΩcm in the WG direction, and anisotropic ratio=maximum value (1.45)/minimum value (1.42)−1=2.1%.

The specific resistance at the upper position in Example 3 was 1.20 mΩcm in the AG direction and 1.19 mΩcm in the WG direction, and anisotropic ratio=maximum value (1.20)/minimum value (1.19)−1=0.8%.

The specific resistance at the central position in Example 3 was 1.15 mΩcm in the AG direction and 1.17 mΩcm in the WG direction, and anisotropic ratio=maximum value (1.17)/minimum value (1.15)−1=1.7%.

The specific resistance at the lower position in Example 3 was 1.20 mΩcm in the AG direction and 1.21 mΩcm in the WG direction, and anisotropic ratio=maximum value (1.21)/minimum value (1.20)−1=1.8%.

The specific resistance at the upper position in Comparative Example 1 was 1.26 mΩcm in the AG direction and 1.23 mΩcm in the WG direction, and anisotropic ratio=maximum value (1.26)/minimum value (1.23)−1=2.4%.

The specific resistance at the central position in Comparative Example 1 was 1.25 mΩcm in the AG direction and 1.18 mΩcm in the WG direction, and anisotropic ratio=maximum value (1.25)/minimum value (1.18)−1=5.9%.

The specific resistance at the lower position in Comparative Example 1 was 1.33 mΩcm in the AG direction and 1.17 mΩcm in the WG direction, and anisotropic ratio=maximum value (1.33)/minimum value (1.17)−1=13.7%.

The specific resistance at the upper position in Comparative Example 2 was 1.30 mΩcm in the AG direction and 1.23 mΩcm in the WG direction, and anisotropic ratio=maximum value (1.30)/minimum value (1.23)−1=5.7%.

The specific resistance at the central position in Comparative Example 2 was 1.27 mΩcm in the AG direction and 1.16 mΩcm in the WG direction, and anisotropic ratio=maximum value (1.27)/minimum value (1.16)−1=9.5%.

The specific resistance at the lower position in Comparative Example 2 was 1.34 mΩcm in the AG direction and 1.13 mΩcm in the WG direction, and anisotropic ratio=maximum value (1.34)/minimum value (1.13)−1=18.6%.

The specific resistance at the upper position in Comparative Example 3 was 1.30 mΩcm in the AG direction and 1.23 mΩcm in the WG direction, and anisotropic ratio=maximum value (1.30)/minimum value (1.23)−1=5.7%.

The specific resistance at the lower position in Comparative Example 3 was 1.34 mΩcm in the AG direction and 1.13 mΩcm in the WG direction, and anisotropic ratio=maximum value (1.34)/minimum value (1.13)−1=18.6%.

Further, the anisotropic ratios of the coefficient of thermal expansion at the respective positions in Examples 1 to 3 and Comparative Examples 1 to 3 were as follows:

The coefficient of thermal expansion at the upper position in Example 1 was $5.10 \times 10^{-6}$ ° C. in the AG direction and $5.09 \times 10^{-6}$ ° C. in the WG direction, and anisotropic ratio=maximum value (5.10)/minimum value (5.09)−1=0.2%.

The coefficient of thermal expansion at the lower position in Example 1 was $5.08 \times 10^{-6}$ ° C. in the AG direction and 5.23×10⁻⁶ ° C. in the WG direction, and anisotropic ratio=maximum value (5.23)/minimum value (5.08)−1=3.0%.

The coefficient of thermal expansion at the upper position in Example 2 was 5.08×10⁻⁶ ° C. in the AG direction and 5.23×10⁻⁶ ° C. in the WG direction, and anisotropic ratio=maximum value (5.23)/minimum value (5.08)−1=3.0%.

The coefficient of thermal expansion at the lower position in Example 2 was 5.16×10⁻⁶ ° C. in the AG direction and 5.30×10⁻⁶ ° C. in the WG direction, and anisotropic ratio=maximum value (5.30)/minimum value (5.16)−1=2.7%.

The coefficient of thermal expansion at the upper position in Example 3 was 4.51×10⁻⁶ ° C. in the AG direction and 4.35×10⁻⁶ ° C. in the WG direction, and anisotropic ratio=maximum value (4.51)/minimum value (4.35)−1=3.7%.

The coefficient of thermal expansion at the central position in Example 3 was 4.34×10⁻⁶ ° C. in the AG direction and 4.45×10⁻⁶ ° C. in the WG direction, and anisotropic ratio=maximum value (4.45)/minimum value (4.34)−1=2.5%.

The coefficient of thermal expansion at the lower position in Example 3 was 4.49×10⁻⁶ ° C. in the AG direction and 4.37×10⁻⁶ ° C. in the WG direction, and anisotropic ratio=maximum value (4.49)/minimum value (4.37)−1=2.7%.

The coefficient of thermal expansion at the upper position in Comparative Example 1 was 4.10×10⁻⁶ ° C. in the AG direction and 3.82×10⁻⁶ ° C. in the WG direction, and anisotropic ratio=maximum value (4.10)/minimum value (3.82)−1=7.3%.

The coefficient of thermal expansion at the central position in Comparative Example 1 was 4.30×10⁻⁶ ° C. in the AG direction and 3.86×10⁻⁶ ° C. in the WG direction, and anisotropic ratio=maximum value (4.30)/minimum value (3.86)−1=11.4%.

The coefficient of thermal expansion at the lower position in Comparative Example 1 was 4.43×10⁻⁶ ° C. in the AG direction and 3.75×10⁻⁶ ° C. in the WG direction, and anisotropic ratio=maximum value (4.43)/minimum value (3.75)−1=18.1%.

The coefficient of thermal expansion at the upper position in Comparative Example 2 was 4.34×10⁻⁶ ° C. in the AG direction and 4.09×10⁻⁶ ° C. in the WG direction, and anisotropic ratio=maximum value (4.34)/minimum value (4.09)−1=6.1%.

The coefficient of thermal expansion at the central position in Comparative Example 2 was 4.50×10⁻⁶ ° C. in the AG direction and 3.73×10⁻⁶ ° C. in the WG direction, and anisotropic ratio=maximum value (4.50)/minimum value (3.73)−1=20.6%.

The coefficient of thermal expansion at the lower position in Comparative Example 2 was 4.65×10⁻⁶ ° C. in the AG direction and 3.83×10⁻⁶ ° C. in the WG direction, and anisotropic ratio=maximum value (4.65)/minimum value (3.83)−1=21.4%.

The coefficient of thermal expansion at the upper position in Comparative Example 3 was 4.34×10⁻⁶ ° C. in the AG direction and 4.09×10⁻⁶ ° C. in the WG direction, and anisotropic ratio=maximum value (4.34)/minimum value (4.09)−1=6.1%.

The coefficient of thermal expansion at the lower position in Comparative Example 3 was 4.64×10⁻⁶ ° C. in the AG direction and 3.83×10⁻⁶ ° C. in the WG direction, and anisotropic ratio=maximum value (4.64)/minimum value (3.83)−1=21.1%.

As is apparent from the table shown in FIG. 9, in the case of Examples 1 to 3, for both the coefficient of thermal expansion and the specific resistance, the anisotropic ratios are 5% or less as the whole materials.

In Comparative Examples 1 and 2, for both the coefficient of thermal expansion and the specific resistance, the anisotropic ratios are 8% or less at the upper positions of the materials in the molding, and about 20% at the lower positions of the materials in the molding. This shows that in Examples 1 to 3, the anisotropic ratios of the coefficient of thermal expansion of the materials are about 5% or less at all positions, compared to that in Comparative Examples 1 and 2, the anisotropic ratios are increased at the lower positions of the materials in the molding. The reasons why the anisotropic ratios are decreased in Examples 1 to 3 are considered to be that compression due to the gravity becomes difficult to occur because the second carbonaceous raw material 10 is granulated, and that the granulated powder itself does not have directionality.

Further, in comparative Example 3, in spite that the grains are substantially spheronized by granulation of the first carbonaceous raw material, for both the specific resistance and the coefficient of thermal expansion, the anisotropic ratios are increased as much as about 20% at the lower position of the material in the molding.

The reason why the anisotropic ratios are increased in Comparative Example 3 in spite that the first carbonaceous raw material is granulated is considered as follows.

In Comparative Example 3, the first carbonaceous raw material is granulated using the hydrophilic binding material 20 having weak bonding force, and thereafter kneading is performed using the hydrophobic binding material. Accordingly, the hydrophilic binding material 20 which granulates the first carbonaceous raw material is collapsed in the course of kneading, resulting in the disappearance of the effect of granulating the first carbonaceous raw material. That is, it is considered that the first carbonaceous raw material substantially comes into the same state as in the case that the first carbonaceous raw material is kneaded using the hydrophobic binding material. Further, the powder obtained by pulverizing the mixture obtained by kneading is subjected to the CIP molding as such. It is therefore considered that the anisotropic powder is uniaxially molded in the rubber case by the gravity to increase the anisotropy.

What is claimed is:

1. A method for producing a graphite material, comprising:
    a kneading step of adding a hydrophobic binding material to a first carbonaceous raw material consisting of coke powder, followed by heat kneading to obtain a mixture, wherein the first carbonaceous raw material has an average grain size of about 5 μm to about 20 μm
    a pulverizing step of pulverizing the mixture Obtained in the kneading step to obtain a second carbonaceous raw material;
    a granulating step of obtaining a granulated powder using the second carbonaceous raw material obtained in the pulverizing step, a hydrophilic binding material and a solvent;
    a molding step of subjecting the granulated powder obtained in the granulating step to cold isostatic press molding to obtain a molded body;
    a burning step of burning the molded body obtained in the molding step to obtain a burnt product; and a. graphitizing step of graphitizing the burnt product obtained in the burning step, wherein, during the granulation step, the granulated powder granulated by the hydrophilic binding material is molded into a substantially round shape, and the second carbonaceous raw material is bonded in a state where the second carbonaceous raw material is isotropically arranged containing voids in the granulated powder, wherein the hydrophobic binding material includes pitch or tar, wherein the hydrophilic. polymer includes polyvinyl alcohol.

wherein the granulating step includes obtaining the granulated powder using an aqueous solvent, wherein the granulating step is performed using a spray dry method, wherein the second carbonaceous raw material is arranged in the granulated powder so that the granular powder contains voids, wherein the second carbonaceous raw material is isotropically arranged in the granulated powder, wherein the granulated powder has a compression failure strength of about 0.02 MPa to about 10.0 MPa and wherein an addition rate of the polyvinyl alcohol is from about 0.1 parts by weight to about 10.0 parts by weight based on 100 parts by weight of the second carbonaceous raw material.

2. The method according to claim 1,
wherein the second carbonaceous raw material has an average grain size of about 15 μm to about 50 μm.

3. The method according to claim 1.
wherein an average grain size of the second carbonaceous raw material is larger than an average grain size of the first carbonaceous raw material.

4. The method according to claim 1,
wherein the granulated powder obtained in the granulating step has an average grain size of about 60 μm to 1,000 μm.

5. The method according to claim 1,
wherein an average grain size of the granulated powder obtained in the granulating step is larger than an average grain size of the second carbonaceous raw material.

6. The method according to claim 1, further comprising:
a step of removing a fine powder having a grain size of about 15 μm or less from the granulated powder obtained in the granulating step, prior to the molding step.

* * * * *